US012781055B2

(12) United States Patent
Lee et al.

(10) Patent No.: US 12,781,055 B2
(45) Date of Patent: Nov. 3, 2026

(54) HARD COATING COMPOSITION, METHOD OF PRODUCING THE HARD COATING COMPOSITION, AND WINDOW INCLUDING HARD COATING LAYER

(71) Applicant: Samsung Display Co., Ltd., Yongin-si (KR)

(72) Inventors: Kilsung Lee, Gwacheon-si (KR); Hoseok Sohn, Seoul (KR); Yongseok Lee, Suwon-si (KR); Jinnyoung Heo, Yongin-si (KR); Boa Kim, Icheon-si (KR); Jiin Yoon, Asan-si (KR); Kyungeun Lee, Asan-si (KR); Seoyoung Jang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 383 days.

(21) Appl. No.: 17/993,162

(22) Filed: Nov. 23, 2022

(65) Prior Publication Data

US 2023/0159763 A1 May 25, 2023

(30) Foreign Application Priority Data

Nov. 24, 2021 (KR) ........................ 10-2021-0163195

(51) Int. Cl.

| | |
|---|---|
| ***C09D 4/06*** | (2006.01) |
| ***C03C 17/00*** | (2006.01) |
| ***C03C 17/30*** | (2006.01) |
| ***C08F 220/18*** | (2006.01) |
| ***C08F 220/20*** | (2006.01) |
| ***C08F 222/10*** | (2006.01) |
| ***C08G 77/442*** | (2006.01) |
| ***C09D 4/00*** | (2006.01) |
| ***C09D 5/00*** | (2006.01) |
| ***C09D 7/40*** | (2018.01) |
| ***C09D 7/61*** | (2018.01) |
| ***C09D 7/63*** | (2018.01) |
| ***C09D 133/14*** | (2006.01) |
| ***C09D 151/08*** | (2006.01) |
| ***C09D 183/00*** | (2006.01) |
| ***C09D 183/10*** | (2006.01) |
| ***G09F 9/30*** | (2006.01) |

(52) U.S. Cl.

CPC .............. *C09D 4/06* (2013.01); *C03C 17/009* (2013.01); *C03C 17/30* (2013.01); *C08F 220/1811* (2020.02); *C08F 220/20* (2013.01); *C08F 222/10* (2013.01); *C08F 222/1006* (2013.01); *C08F 222/103* (2020.02); *C08F 222/1065* (2020.02); *C09D 4/00* (2013.01); *C09D 5/00* (2013.01); *C09D 7/40* (2018.01); *C09D 7/61* (2018.01); *C09D 7/63* (2018.01); *C09D 133/14* (2013.01); *C09D 151/08* (2013.01); *C09D 183/00* (2013.01); *C09D 183/10* (2013.01); *G09F 9/301* (2013.01); *C03C 2217/78* (2013.01); *C08G 77/442* (2013.01)

(58) Field of Classification Search

CPC .......... C09D 4/06; C09D 7/61; C09D 133/14; C09D 7/63; C09D 4/00; C09D 151/08; C09D 5/00; C09D 7/40; C03C 17/30; C03C 17/009; C03C 2217/78; C08F 220/1811; C08F 220/20; C08F 222/10; C08F 222/1006; C08F 222/103; C08F 222/1065; C08G 77/442; G09F 9/301

See application file for complete search history.

(56) References Cited

U.S. PATENT DOCUMENTS 9,193,880 B2 11/2015 Allam et al.
2016/0039851 A1* 2/2016 Müller ...................... C07F 9/34 522/63
2018/0327634 A1* 11/2018 Heo ..................... C09D 183/04

FOREIGN PATENT DOCUMENTS

| | | | |
|---|---|---|---|
| KR | 101402105 B1 | | 6/2014 |
| KR | 101434701 B1 | | 8/2014 |
| KR | 1020180000247 | * | 1/2018 |
| KR | 20180125116 A | | 11/2018 |
| KR | 101948655 B1 | | 2/2019 |
| KR | 101976525 B1 | | 5/2019 |
| KR | 102273507 B1 | | 7/2021 |
| KR | 20210096938 A | | 8/2021 |

OTHER PUBLICATIONS

Machine English translation of KR 1020180000247, Park, Jan. 2, 2018.*

* cited by examiner

*Primary Examiner* — Patrick D Niland
(74) *Attorney, Agent, or Firm* — CANTOR COLBURN LLP

(57) ABSTRACT

A hard coating composition includes a silica-silsesquioxane-based resin, a photoinitiator, and a diluting monomer. The diluting monomer includes at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer.

11 Claims, 16 Drawing Sheets

HARD COATING COMPOSITION, METHOD OF PRODUCING THE HARD COATING COMPOSITION, AND WINDOW INCLUDING HARD COATING LAYER

This application claims priority to Korean Patent Application No. 10-2021-0163195, filed on Nov. 24, 2021, and all the benefits accruing therefrom under 35 U.S.C. § 119, the content of which in its entirety is herein incorporated by reference.

BACKGROUND

1. Field

Embodiments of the invention herein relate to a hard coating composition, a method of producing the hard coating composition, and a window including a hard coating layer, and more particularly, to a hard coating composition including a silica-silsesquioxane-based resin, a method for producing the hard coating composition, and a window including a hard coating layer containing a coating polymer derived from a silica-silsesquioxane-based resin.

2. Description of the Related Art

Various types of display devices have been used to provide image information, and such display devices include a display module for displaying an image and a window member for protecting the display module. In particular, the window member constitutes the outer surface of the display device, at the same time provides a touch surface, and thus desires high surface hardness and impact resistance so as to have reliability even after repeated use.

In addition, recently, windows to be utilized in flexible display devices are being developed. The windows utilized in the flexible display devices are desired to secure not only surface hardness or strength and impact resistance, but also secure flexibility for preventing deformation against bending or folding.

SUMMARY

Embodiments of the invention provide a hard coating composition for forming a hard coating layer that has flexibility while maintaining excellent surface hardness, and a method of producing the hard coating composition.

Embodiments of the invention also provide a window including a hard coating layer having good folding properties and excellent mechanical properties.

An embodiment of the invention provides a hard coating composition including a silica-silsesquioxane-based resin, a photoinitiator, and a diluting monomer. The diluting monomer includes at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer.

In an embodiment, the silica-silsesquioxane-based resin may exclude a solvent.

In an embodiment, the hard coating composition may include about 2 weight percent (wt %) to about 22 wt % of the silica-silsesquioxane-based resin, about 40 wt % to about 80 wt % of the diluting monomer, and about 1 wt % to about 5 wt % of the photoinitiator with respect to a total weight of the hard coating composition.

In an embodiment, the hard coating composition may include about 2 wt % to about 22 wt % of the silica-silsesquioxane-based resin, about 27 wt % to about 47 wt % of the 2-hydroxyethyl acrylate monomer, and about 13 wt % to about 33 wt % of the tetrahydrofurfuryl acrylic acid monomer, and about 1 wt % to about 5 wt % of the photoinitiator with respect to a total weight of the hard coating composition.

In an embodiment, the photoinitiator may include a first photoinitiator activated by light having a first wavelength and a second photoinitiator activated by light having a second wavelength shorter than the first wavelength.

In an embodiment, the first photoinitiator may be activated by light in a wavelength range of about 360 nanometer (nm) to about 410 nm and the second photoinitiator may be activated by light in a wavelength range of about 230 nm to about 310 nm.

In an embodiment, the first photoinitiator may be a diphenyl(2,4,6-trimethylbenzoyl)phosphine oxide, and the second photoinitiator may be a (1-hydroxycyclohexyl)phenylmethanone.

In an embodiment, the hard coating composition may further include 2-isopropylthioxanthone.

In an embodiment, the hard coating composition may include about 0.1 wt % to about 1 wt % of the 2-isopropylthioxanthone with respect to a total weight of the hard coating composition.

In an embodiment, the hard coating composition may further include at least one of trimethoxy[3-(oxyranylmethoxy)propyl]silane, bis[2-(methacryloyloxy)ethyl] phosphate, siloxane and silicone, at least one of a polyester resin, a urethane resin, a polyurea resin, and an epoxy resin, and at least one of a nanosilica, a porous silica, a zirconium oxide, an aluminum oxide, and a core-shell rubber, wherein the hard coating composition may include, with respect to the total weight of the hard coating composition, about 2 wt % to about 22 wt % of the silica-silsesquioxane-based resin, about 27 wt % to about 47 wt % of the 2-hydroxyethyl acrylate monomer, about 13 wt % to about 33 wt % of the tetrahydrofurfuryl acrylic acid monomer, about 1 wt % to about 5 wt % of the photoinitiator, about 7 wt % to about 17 wt % of the trimethoxy[3-(oxyranylmethoxy)propyl]silane, about 4 wt % to about 14 wt % of the bis[2-(methacryloyloxy)ethyl] phosphate, about 0.1 wt % to about 1.0 wt % of at least one of the siloxane and the silicone, about 5.0 wt % to about 15.0 wt % of at least one of the polyester resin, the urethane resin, the polyurea resin, and the epoxy resin, and about 5.0 wt % to about 15.0 wt % of at least one of the nanosilica, the porous silica, the zirconium oxide, the aluminum oxide, and the core-shell rubber.

In an embodiment, the hard coating composition may have a viscosity of about 10 centipoise (cps) to about 30 cps at room temperature (about 25 degrees Celsius (° C.)).

In an embodiment of the invention, a window includes a folding part that is folded with respect to a folding axis extending in a predetermined direction, a first non-folding part and a second non-folding part that are spaced apart from each other with the folding part disposed therebetween, a glass substrate, a hard coating layer disposed on at least one of a first portion of the glass substrate and a second portion of the glass substrate opposite to the first portion of the glass substrate. The hard coating layer includes a coating polymer derived from a hard coating composition including a silica-silsesquioxane-based resin, a photoinitiator, and a diluting monomer, and the diluting monomer includes at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer.

In an embodiment, the hard coating layer may have a thickness of about 20 micrometers (μm) to about 40 μm.

In an embodiment, the hard coating layer may include a first hard coating layer disposed on the upper portion of the glass substrate, and a second hard coating layer disposed on the lower portion of the glass substrate.

In an embodiment, the window may further include an auxiliary coating layer which is disposed between the hard coating layer and the glass substrate and includes different materials from that of the hard coating layer.

In an embodiment, the auxiliary coating layer may include perhydro-polysilazane, a silane coupling agent, or a self-healing polymer.

In an embodiment, the auxiliary coating layer may be thinner than the hard coating layer.

In an embodiment, the hard coating layer may have a thickness of about 10 μm to about 30 μm, and the auxiliary coating layer may have a thickness of about 5 μm to about 10 μm.

In an embodiment of the invention, a method of producing a hard coating composition includes providing a preliminary silica-silsesquioxane-based resin including a silica-silsesquioxane-based resin and a solvent, removing the solvent from the preliminary silica-silsesquioxane-based resin, and adding a diluting monomer and a photoinitiator to the silica-silsesquioxane-based resin from which the solvent has been removed, wherein the diluting monomer includes at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer.

In an embodiment, the removing the solvent may include heating the preliminary silica-silsesquioxane-based resin at a temperature of about 40° C. to about 60° C.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain principles of the invention. In the drawings.

DETAILED DESCRIPTION

Figure 1A:
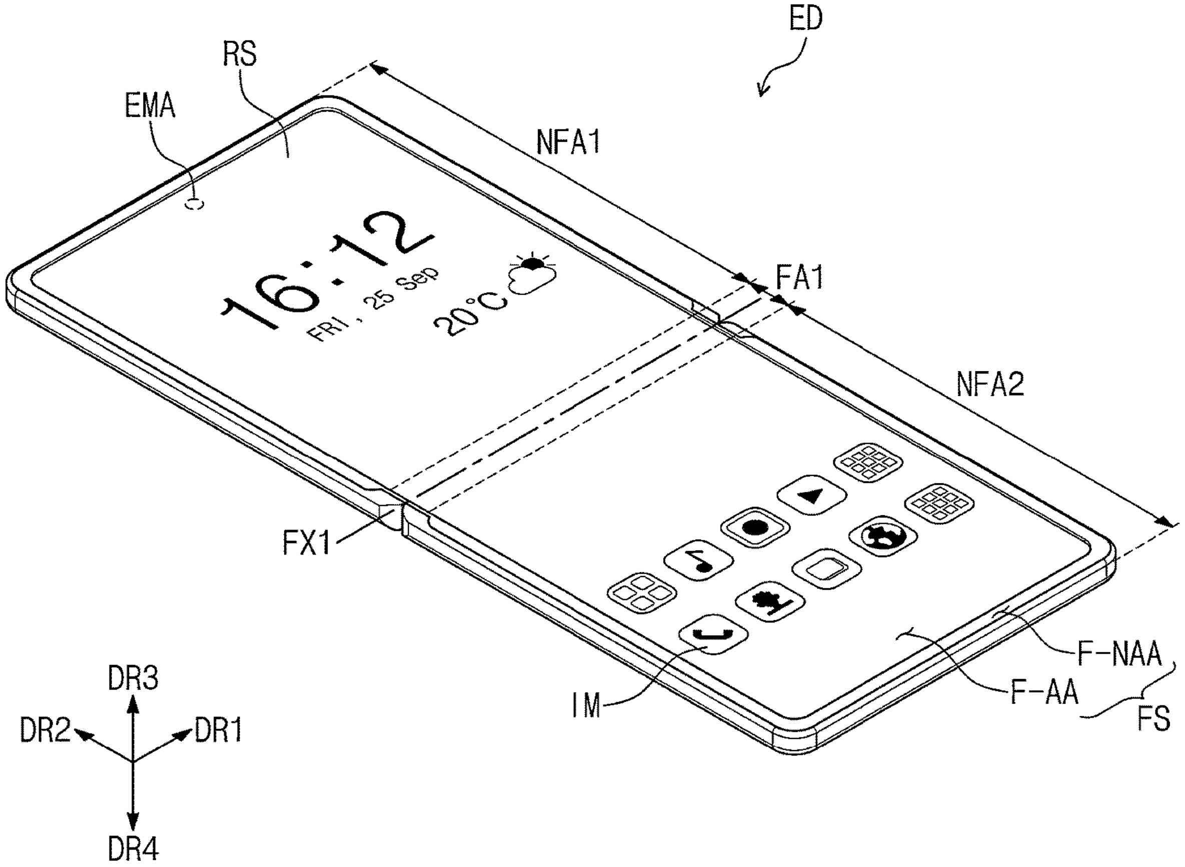
FIG. 1A is a perspective view illustrating an unfolded state of an electronic device according to the invention.

Embodiments of the invention may be modified in many alternate forms, and thus specific embodiments will be exemplified in the drawings and described in this text in detail. It should be understood, however, that it is not intended to limit the invention to the particular forms disclosed, but rather, is intended to cover all modifications, equivalents, and alternatives falling within the spirit and scope of the invention.

In the specification, when an element (or a region, a layer, a portion, etc.) is referred to as being "on," "connected to," or "coupled to" another element, it means that the element may be directly disposed on/connected to/coupled to the other element, or that a third element may be disposed therebetween.

In the invention, "directly disposed" means that there is no layer, film, region, plate or the like added between a portion of a layer, a film, a region, a plate or the like and other portions. A term "directly disposed," for example, may mean disposing without additional members such as an adhesive member between two layers or two members.

Like reference numerals refer to like elements. Also, in the drawings, the thicknesses, ratios, and dimensions of the elements are exaggerated for effective description of technical contents.

The term "and/or" includes all combinations of one or more of which associated configurations may define.

It will be understood that, although the terms "first", "second", etc., may be used herein to describe various elements, these elements should not be limited by these terms. These terms are only used to distinguish one element from another. A first element could be termed a second element, and, similarly, a second element could be termed a first element, for example, without departing from the scope of the invention. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings. In the specification, the expression "disposed on" may refer to the case of being disposed on a lower portion of a member as well as the case of being on an upper portion of a member.

Unless otherwise defined, all terms (including technical and scientific terms) used herein have the same meaning as commonly understood by one of ordinary skill in the art to which this invention belongs. In addition, it will be understood that terms, such as those defined in commonly used dictionaries, should be interpreted as having a meaning that is consistent with their meaning in the context of the relevant art and will not be interpreted in an idealized or overly formal sense unless expressly so defined herein.

It should be understood that the terms "include," "have," or the like are intended to specify the presence of stated features, integers, steps, operations, elements, components, or combinations thereof in the invention, but do not preclude the presence or addition of one or more other features, integers, steps, operations, elements, components, or combinations thereof.

Hereinafter, a hard coating composition in an embodiment of the invention, a method of producing the hard coating composition, and a window including a hard coating layer will be described with reference to the accompanying drawings.

Figure 1B:
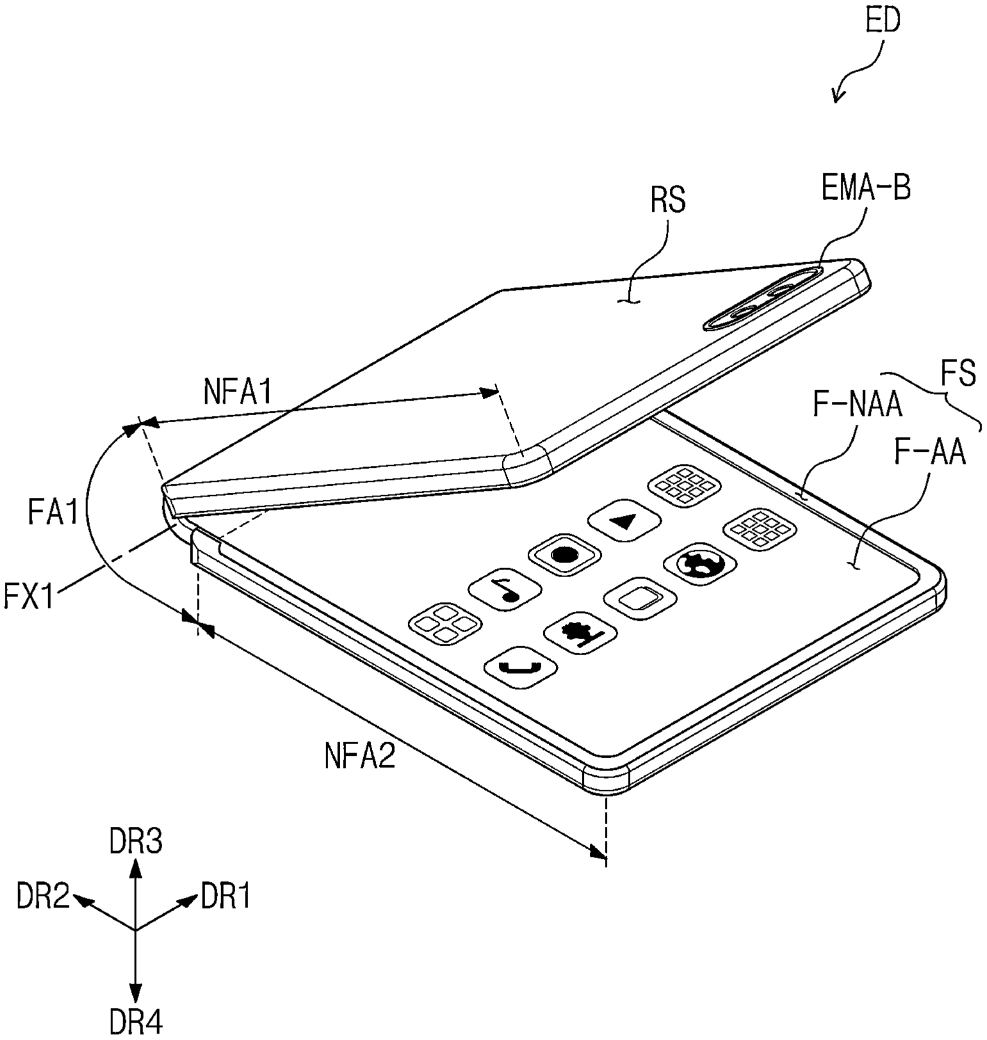
FIG. 1B is a perspective view illustrating an inner-folding process of the electronic device illustrated in FIG. 1A.

FIG. 1A is a perspective view illustrating an embodiment of an unfolded state of an electronic device. FIG. 1B is a perspective view illustrating an inner-folding process of the electronic device illustrated in FIG. 1A. The electronic device ED of an embodiment may be a device that is activated according to an electrical signal. In an embodiment, the electronic device ED may be a mobile phone, a tablet, a car navigation device, a game console, or a wearable device, for example, but the invention is not limited thereto. FIG. 1A, etc., in the specification illustrate that the electronic device ED is a mobile phone.

FIG. 1A and drawings therebelow illustrate a first directional axis DR1 to a fourth directional axis DR4, and the directions indicated by the first to fourth directional axes DR1, DR2, DR3 and DR4 described in this specification are relative concepts and may be converted into other directions. In addition, the directions indicated by the first to fourth directional axes DR1, DR2, DR3 and DR4 may be described as first to fourth directions, and the same reference symbols may be used.

Referring to FIGS. 1A and 1B, the electronic device ED in an embodiment may include a display surface FS defined by a first directional axis DR1 and a second directional axis DR2 crossing the first directional axis DR1. The electronic device ED may provide an image IM for a user through the display surface FS. The electronic device ED of an embodiment may display an image IM toward a third direction DR3 on a display surface FS parallel to each of a first directional axis DR1 and a second directional axis DR2. In the specification, a front surface (or a top surface) or a rear surface (or a bottom surface) of each of the constituents may be defined with respect to a direction in which the image IM is displayed. In the specification, the direction in which the image IM is displayed may be defined as the third direction DR3, and the fourth direction DR4 may be defined as a direction opposite to the third direction DR3.

The electronic device ED in an embodiment may detect external inputs applied from the outside. The external inputs may include various forms of inputs provided from the outside of the electronic device ED. In an embodiment, the external inputs may include external inputs applied when approaching the electronic device ED or being adjacent to the electronic device ED by a preset distance (e.g., hovering), as well as contacting the electronic device ED by a part of a body such as a user's hand. In addition, the external inputs may have various forms such as force, pressure, temperature, and light.

The display surface FS of the electronic device ED may include an active region F-AA and a peripheral region F-NAA. The active region F-AA may be a region which is activated in response to an electrical signal. The electronic device ED in an embodiment may display the image IM through the active region F-AA. In addition, the electronic device ED may detect various forms of external inputs in the active region F-AA. The peripheral region F-NAA is adjacent to the active region F-AA. The peripheral region F-NAA may have a predetermined color. The peripheral region F-NAA may surround the active region F-AA. Accordingly, the shape of the active region F-AA may be substantially defined by the peripheral region F-NAA. However, this is an illustrative embodiment, and in other embodiments, the peripheral region F-NAA may be disposed adjacent to only one side of the active region F-AA, or may be omitted. The electronic device ED in an embodiment of the invention may include active regions having various shapes and is not limited to any particular embodiment.

The electronic device ED may include a folding region FA1 and non-folding regions NFA1 and NFA2. The electronic device ED may include a plurality of non-folding regions NFA1 and NFA2. The electronic device ED of an embodiment may include a first non-folding region NFA1 and a second non-folding region NFA2 disposed with the folding region FA1 disposed therebetween. FIGS. 1A and 1B illustrate an embodiment of the electronic device ED including one folding region FA1, but the invention is not limited thereto, and a plurality of folding regions may be defined in the electronic device ED.

Referring to FIG. 1B, the electronic device ED in an embodiment may be folded with respect to a first folding axis FX1. The first folding axis FX1 is an imaginary axis extending in the first directional axis (also referred to as a first direction) DR1, and the first folding axis FX1 may be parallel to the direction of short sides of the electronic device ED. The first folding axis FX1 may extend along the first directional axis DR1 on the display surface FS.

In an embodiment, non-folding regions NFA1 and NFA2 may be adjacent to the folding region FA1 with the folding region FA1 located therebetween. In an embodiment, the first non-folding region NFA1 may be disposed on one side of the folding region FA1 along the second directional axis (also referred to as a second direction DR2), and the second non-folding region NFA2 may be disposed on the other side of the folding region FA1 along the second direction DR2, for example.

The electronic device ED may be folded with respect to the first folding axis FX1 to be transformed into an inner-folded state in which one region overlapping the first non-folding region NFA1 and the other region overlapping the second non-folding region NFA2 on the display surface FS face each other.

However, the invention is not limited thereto, and the electronic device of an embodiment may be folded with respect to a plurality of folding axes so that some of the display surface FS face each other, and the number of folding axes and the number of non-folding regions corresponding thereto are not particularly limited.

The active region F-AA may include an electronic module region EMA. The electronic module region EMA may have various electronic modules disposed. In an embodiment, the electronic module may include at least one of a camera, a speaker, a light detection sensor, and a thermal detection sensor, for example. The electronic module region EMA may detect an external subject received through the display surfaces FS or provide sound signals such as voice to the outside through the display surfaces FS. The electronic module may include a plurality of components, and is not limited to any particular embodiment.

The electronic module region EMA may be surrounded by the active region F-AA and the peripheral region F-NAA. The electronic module region EMA may be disposed within the active region F-AA, but is not limited to any particular embodiment.

In addition, the electronic device ED of an embodiment may further include an electronic module region EMA-B disposed on a rear surface RS. The electronic module region EMA-B disposed on the rear surface RS may have a camera, a speaker, a light detection sensor, etc., disposed.

Figure 1C:
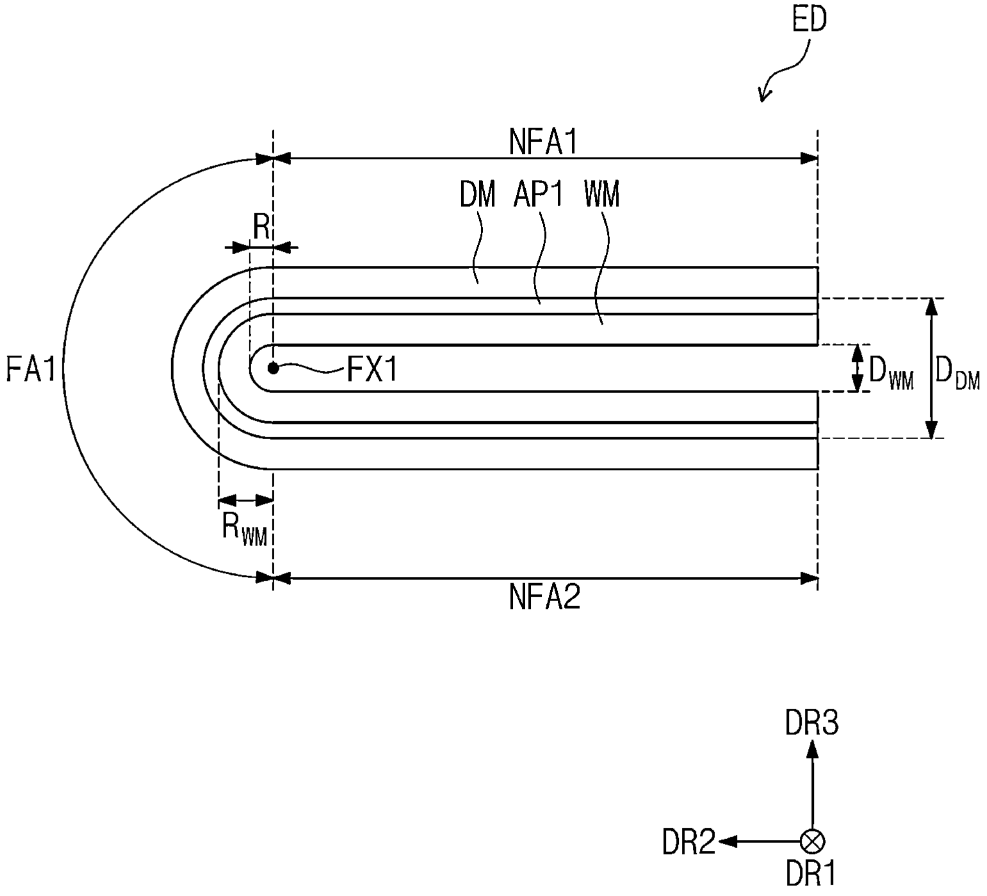
FIG. 1C is a view schematically illustrating a cross-section of the folded electronic device of an embodiment.

FIG. 1C is a view schematically illustrating a cross-section of the folded electronic device ED of an embodiment. For the folded electronic device ED of an embodiment, a distance $D_{WM}$ between the top surfaces of windows WM facing each other may be shorter than a distance $D_{DM}$ between the top surfaces of display modules DM facing each other. The folding region FA1 with respect to the first folding axis FX1 in the electronic device ED of an embodiment may have a radius of curvature R of about 1 millimeter (mm) or more. In the window WM, a folding part FP (refer to FIG. 3) with respect to the first folding axis may have a radius of curvature Rwm of about 0.1 mm to about 2.0 mm.

Figure 2A:
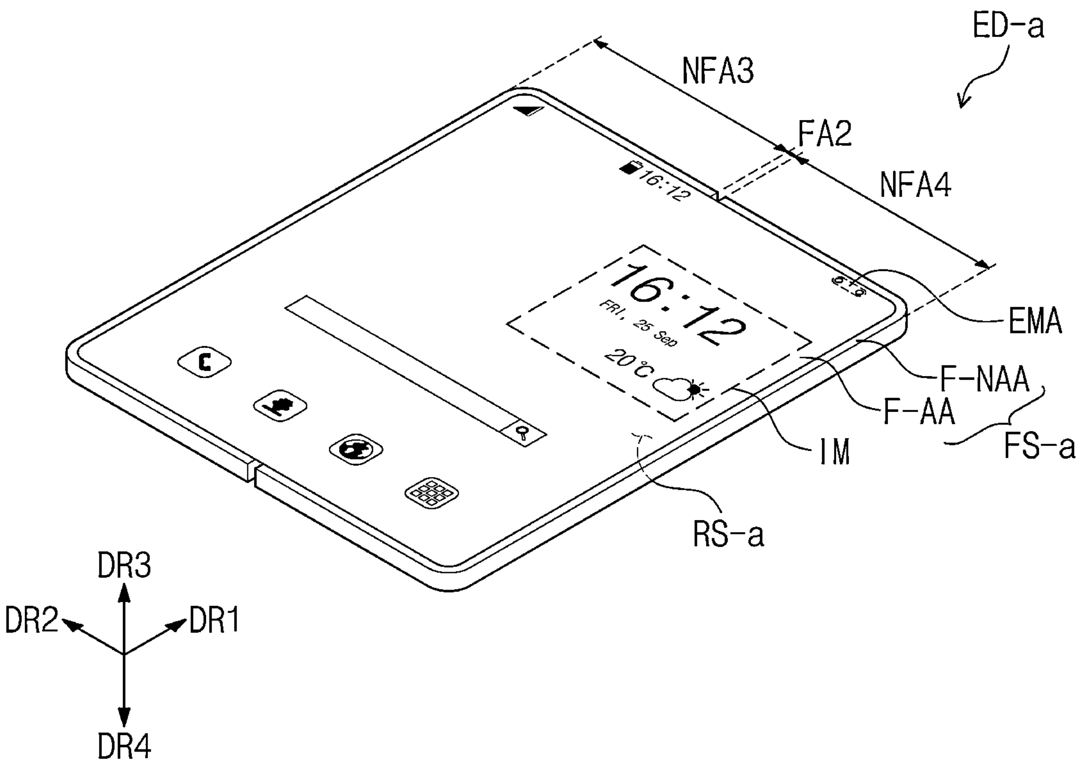
FIG. 2A is a perspective view illustrating an unfolded state of a display device according to the invention.
Figure 2B:
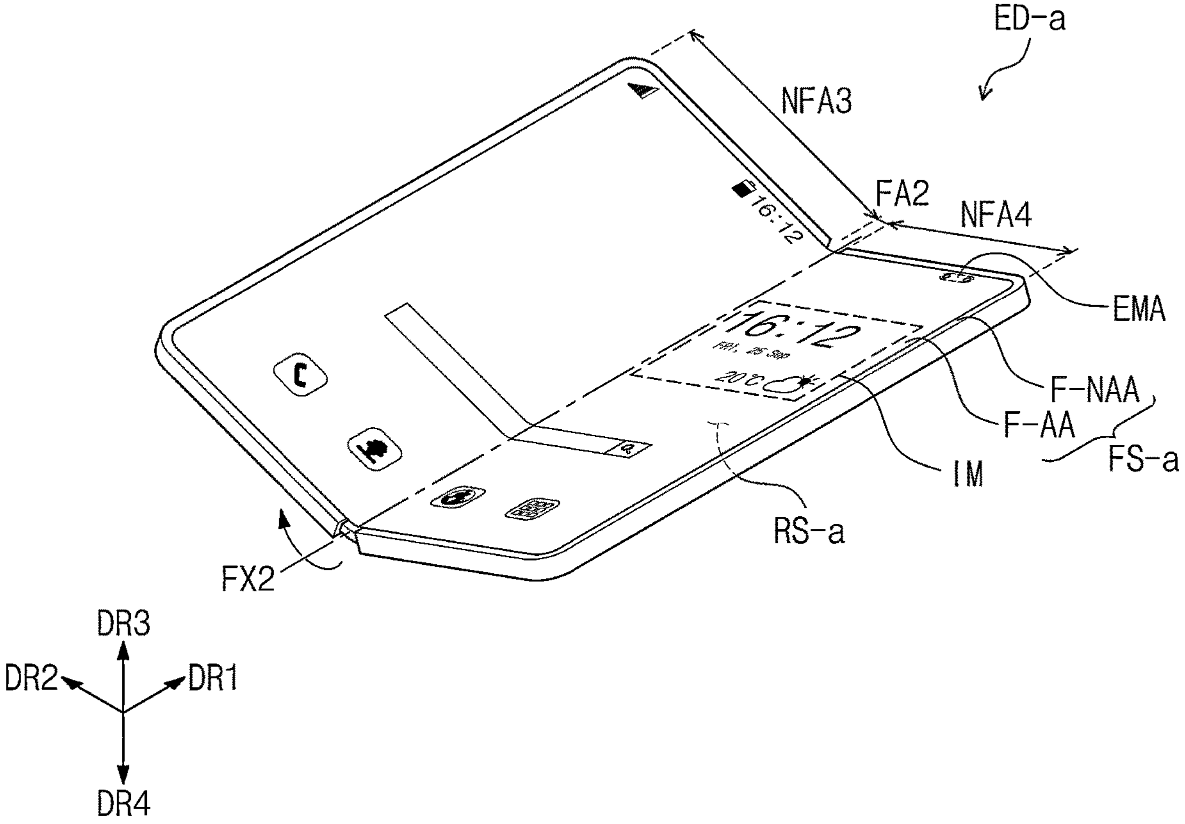
FIG. 2B is a perspective view illustrating an inner-folding process of the display device illustrated in FIG. 2A.
Figure 2C:
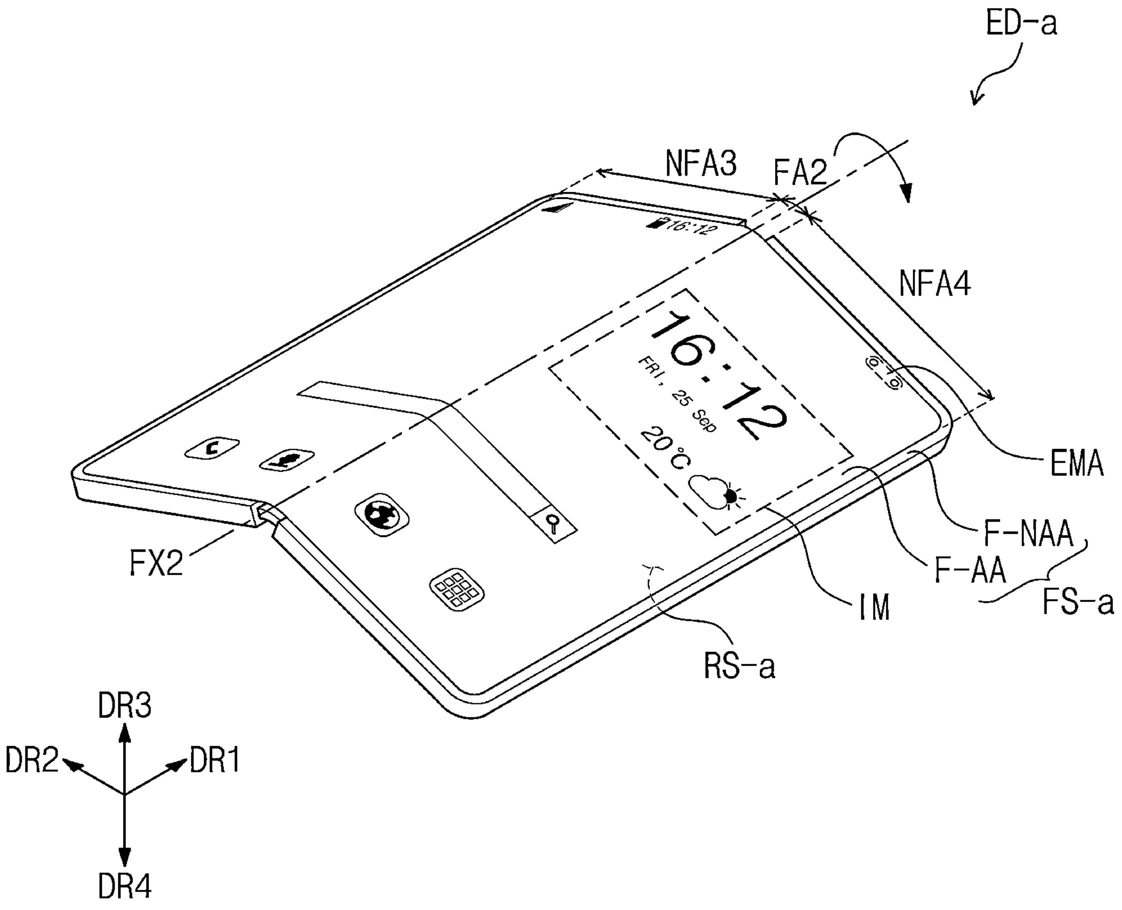
FIG. 2C is a perspective view illustrating an outer-folding process of the display device illustrated in FIG. 2A.

FIG. 2A is a perspective view illustrating an embodiment of an unfolded state of a display device according to the invention. FIG. 2B is a perspective view illustrating an inner-folding process of the display device illustrated in FIG. 2A. FIG. 2C is a perspective view illustrating an outer-folding process of the display device illustrated in FIG. 2A.

The display device ED-a in an embodiment may include at least one folding region FA2 and non-folding regions NFA3 and NFA4 adjacent to the folding region FA2. The non-folding regions NFA3 and NFA4 may be spaced apart from each other with the folding region FA2 disposed therebetween.

The folding region FA2 has a preset curvature and radius of curvature. In an embodiment, a first non-folding region NFA3 and a second non-folding region NFA4 may face each other, and the display device ED-a may be inner-folded with reference to a second folding axis FX2 so that the display surface FS is not exposed to the outside. In contrast to the first folding axis FX1 parallel to a shorter side of the ED in the embodiment of FIGS. 1A to 1C, the second folding axis FX2 may be parallel to a longer side of the ED-a.

In addition, unlike the configuration illustrated, in an embodiment, the display device ED-a may be outer-folded with reference to the second folding axis FX2 so that the display surface FS is exposed to the outside. For the display device ED-a in an embodiment, the first display surface FS in a non-folded state may be viewed by a user, and a second display surface RS in an inner-folded state may be viewed by a user. The second display surface RS may include an electronic module region EMA in which an electronic module including various components is disposed.

The display device ED-a in an embodiment may include the second display surface RS, and the second display surface RS may be defined as a surface opposite to at least a portion of the first display surface FS. In the inner-folded state, the second display surface RS may be viewed by a user. The second display surface RS may include an electronic module region EMA in which an electronic module including various components is disposed. In an embodiment, an image may be provided through the second display surface RS.

In an embodiment, the display devices ED and ED-a may be configured so that the inner-folding or outer-folding operation from an unfolding operation is repeated, but the invention is not limited thereto. In an embodiment, the display devices ED and Ed-a may be configured so that any one among the unfolding operation, inner-folding operation, and outer-folding operation may be selected.

Figure 3:
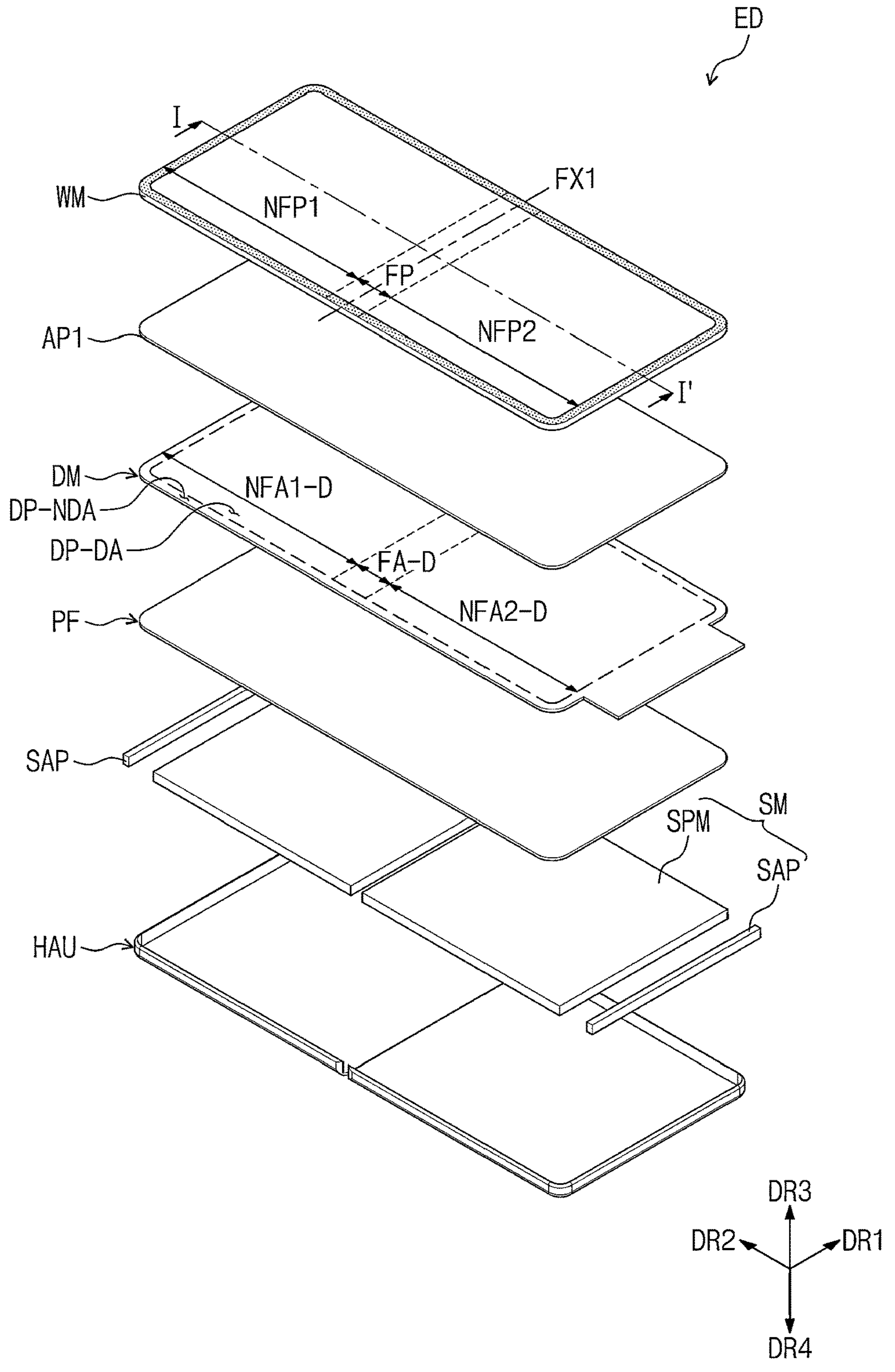
FIG. 3 is an exploded perspective view of an embodiment of an electronic device according to the invention.
Figure 4:
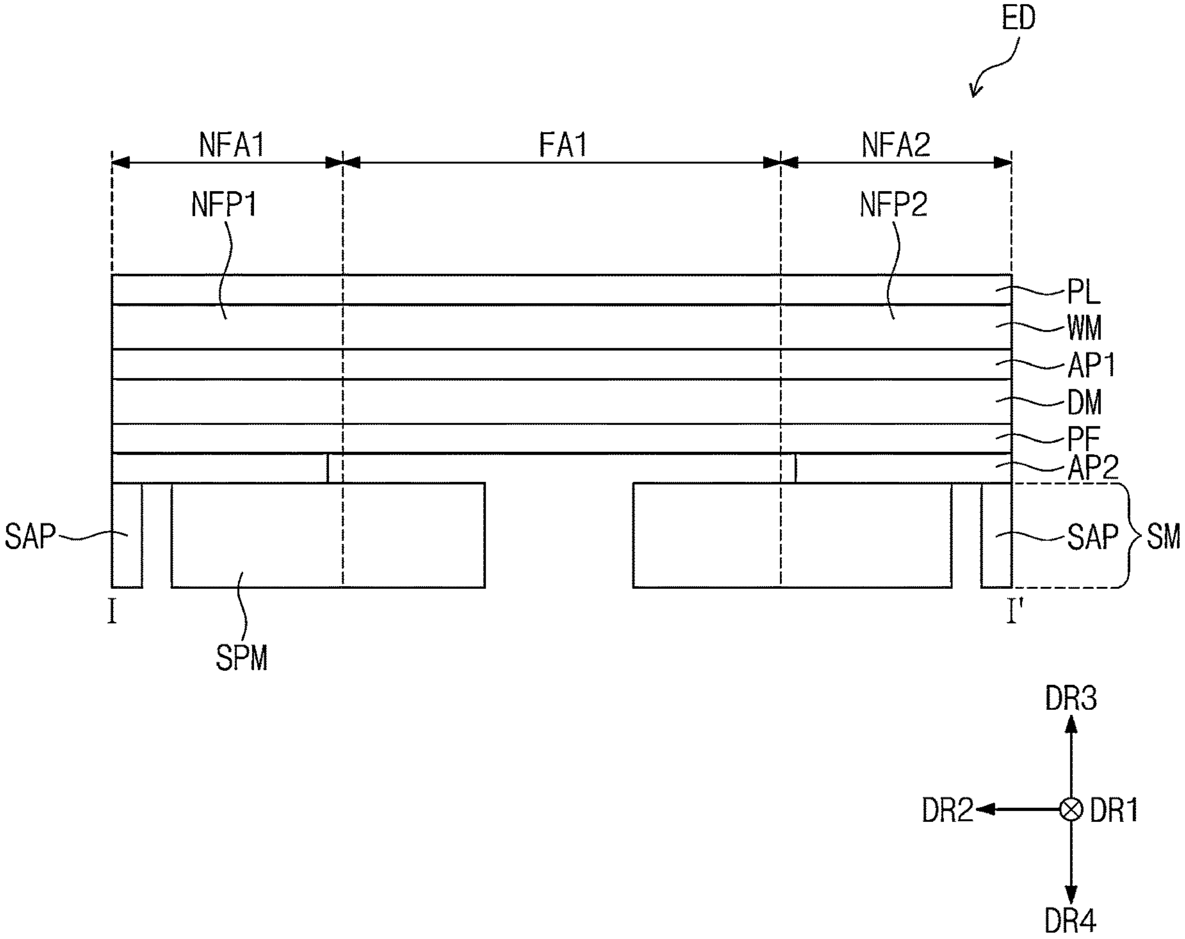
FIG. 4 is a cross-sectional view of an embodiment of an electronic device according to the invention.

FIG. 3 is an exploded perspective view of an embodiment of the electronic device according to the invention. FIG. 4 is a cross-sectional view of an embodiment of the electronic device according to the invention. FIG. 3 illustrates the exploded perspective view of the electronic device in an embodiment illustrated in FIG. 1A. FIG. 4 is the cross-sectional view illustrating a part taken along line I-I' of FIG. 3.

Referring to FIGS. 3 and 4, the electronic device ED of an embodiment may include the display module DM, and the window WM disposed on the display module DM. In addition, the electronic device ED of an embodiment may further include an adhesive layer AP1 disposed between the display module DM and the window WM. The electronic device ED of an embodiment may include a lower module SM and a lower protective layer PF disposed below the display module DM. The electronic device ED of an embodiment may further include an upper protective layer PL disposed on the window WM.

The window WM may cover the entire outside of the display module DM. The window WM may have a shape corresponding to the shape of the display module DM. In addition, the electronic device ED may include a housing HAU accommodating the display module DM, the lower module SM, etc. The housing HAU may be coupled to the window WM. Although not illustrated, the housing HAU may further include a hinge structure for facilitating folding or bending.

In the electronic device ED of an embodiment, the window WM may include an optically clear insulating material. The window WM may be a glass substrate or polymer substrate. In an embodiment, the window WM may include a tempered glass substrate, for example.

The electronic device ED of an embodiment may further include the adhesive layer AP1 disposed between the window WM and the display module DM. The adhesive layer AP1 may be an optically clear adhesive film ("OCA") or an optically clear adhesive resin layer ("OCR"). In an embodiment, the adhesive layer AP1 may be omitted.

The upper protective layer PL may serve to protect the window WM. The upper protective layer PL may include a synthetic resin film. The synthetic resin film may include polyimide, polycarbonate, poly amide, triacetylcellulose, polymethylmethacrylate, or polyethylene terephthalate. Although not illustrated separately, at least one of a hard coating layer, an anti-fingerprint layer, and an anti-reflective layer may be disposed on the top surface of the upper protective layer PF.

The display module DM may display an image in response to an electrical signal and transceive information on an external input. The display module DM may include a display region DP-DA and a non-display region DP-NDA. The display region DP-DA may be defined as a region emitting an image provided from the display module DM.

The non-display region DP-NDA is adjacent to the display region DP-DA. In an embodiment, the non-display region DP-NDA may surround the display region DP-DA, for example. However, this is an illustrative embodiment, and the non-display region DP-NDA may have various shapes, and is not limited to any particular embodiment. In an embodiment, the display region DP-DA of the display module DM may correspond to at least a portion of the active region F-AA (refer to FIG. 1A). Although not illustrated, the display module DM may include a display panel (not illustrated), and an input sensor (not illustrated) disposed on the display panel (not illustrated).

The display module DM may include a folding display part FA-D and non-folding display parts NFA1-D and NFA2-D. The folding display part FA-D may correspond to the folding region FA1 (refer to FIG. 1A), and the non-folding display parts NFA1-D and NFA2-D may correspond to the non-folding regions NFA1 and NFA2 (refer to FIG. 1A).

The folding display part FA-D may correspond to a part that is folded or bent with respect to the first folding axis FX1 extending in the first direction DR1. The display module DM may include a first non-folding display part NFA1-D and a second non-folding display part NFA2-D, and the first non-folding display part NFA1-D and the second non-folding display part NFA2-D may be spaced apart from each other with the folding display part FA-D disposed therebetween. The first non-folding display part NFA1-D and the second non-folding display part NFA2-D may be spaced apart from each other in the second direction DR2 with the folding display part FA-D disposed therebetween.

The lower module SM in the electronic device ED in an embodiment may include a support member SPM and a filling part SAP. The support member SPM may overlap most of the display module DM. The filling part SAP may be disposed outside the support member SPM and overlap the outer part of the display module DM.

The support member SPM may include at least one of a support plate, a cushion layer, a shielding layer, and an inter-bonding layer, which includes metal materials or polymer materials. The support member SPM may support the display module DM or prevent the display module DM from being deformed, etc., caused by an external impact and force.

The cushion layer may include an elastomer such as sponge, foam, or a urethane resin. In addition, the cushion layer may include at least one of an acrylic-based polymer, a urethane-based polymer, a silicon-based polymer, and an imide-based polymer. The shielding layer may be an electromagnetic wave shielding layer or a heat dissipating layer. In addition, the shielding layer may function as a bonding layer. The inter-bonding layer may be provided in a form of a bonding resin layer or an adhesion tape. The inter-bonding layer may bond members included in the support member SPM.

The filling part SAP may be disposed on the outer part of the support member SPM. The filling part SAP may be disposed between the display module DM and the housing HAU. The filling part SAP may fill a space between the lower protective layer PF and the housing HAU, and fix the lower protective layer PF.

In addition, the electronic device ED of an embodiment may further include at least one bonding layer AP2. The bonding layer AP2 may be disposed between the lower protective layer PF and the lower module SM. The bonding layer AP2 may be an optically clear adhesive film ("OCA") or an optically clear adhesive resin layer ("OCR"). However, the invention is not limited thereto, and at least one bonding layer AP2 may be an adhesive layer having a low transmittance of about 80% or less.

The window WM may include a folding part FP and non-folding parts NFP1 and NFP2. The folding part FP may correspond to the folding region FA1 of the electronic device ED. The folding part FP of the window WM may correspond to the folding display part FA-D of the display module DM.

The folding part FP of the window WM may be folded with respect to the first folding axis FX1 that is an imaginary folding axis extending in one direction. A first non-folding part NFP1 and a second non-folding part NFP2 may be spaced apart from each other with the folding part FP located therebetween. The folding part FP may be folded with respect to the folding axis FX1 extending in the first direction DR1, and the first non-folding part NFP1 and the second non-folding part NFP2 may be spaced apart from each other in the second direction DR2 perpendicular to the first direction DR1 with the folding part FP located therebetween.

Figure 5A:
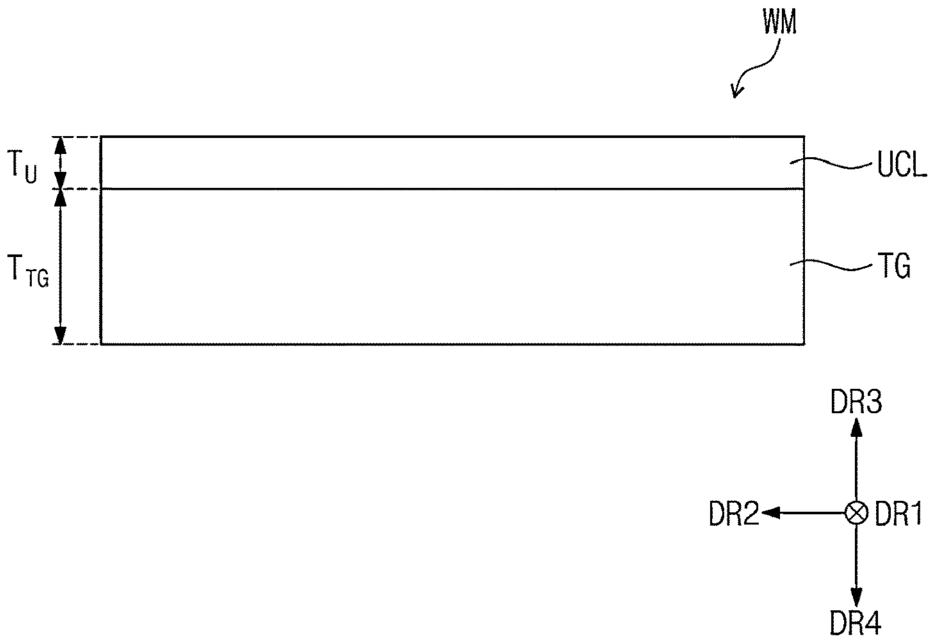
FIG. 5A illustrates a cross-sectional view of an embodiment of a window according to the invention.
Figure 5B:
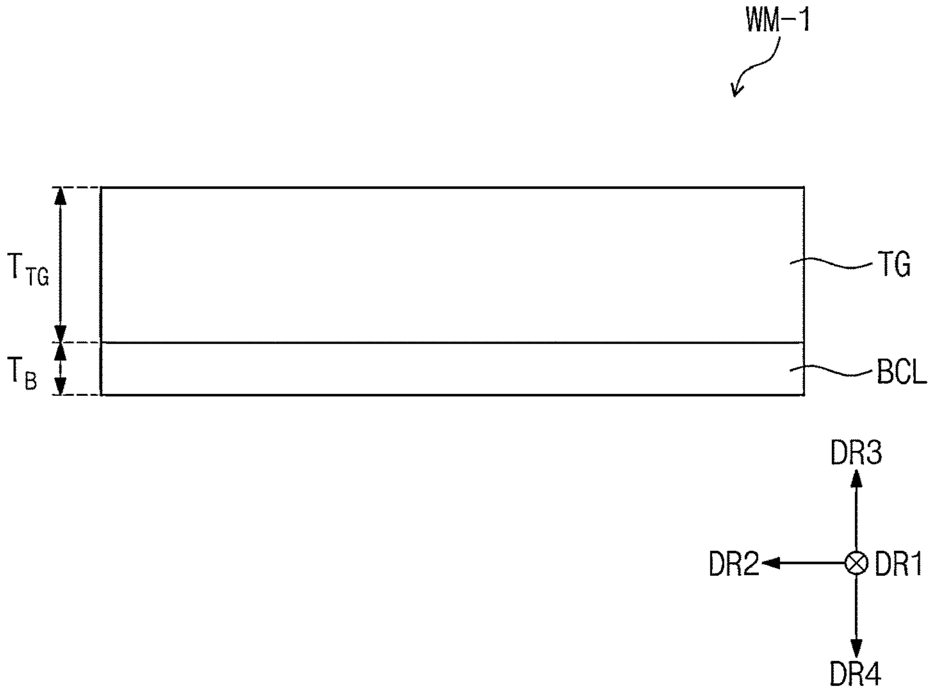
FIG. 5B illustrates a cross-sectional view of an embodiment of a window according to the invention.
Figure 5C:
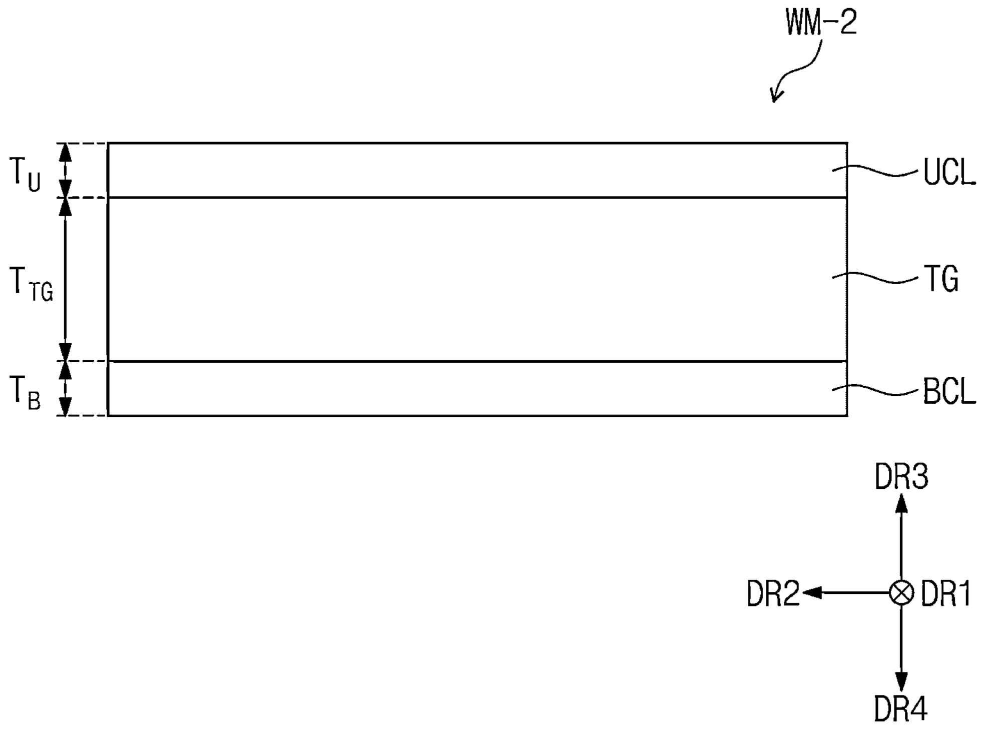
FIG. 5C illustrates a cross-sectional view of an embodiment of a window according to the invention.
Figure 6A:
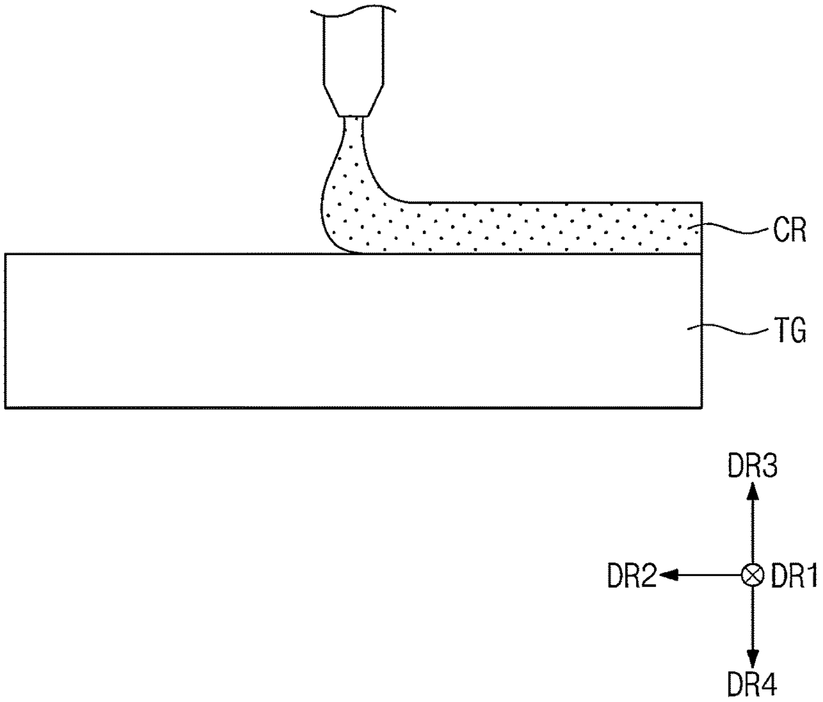
FIG. 6A is a view schematically illustrating an embodiment of a method of producing a hard coating layer of a window according to the invention.
Figure 6B:
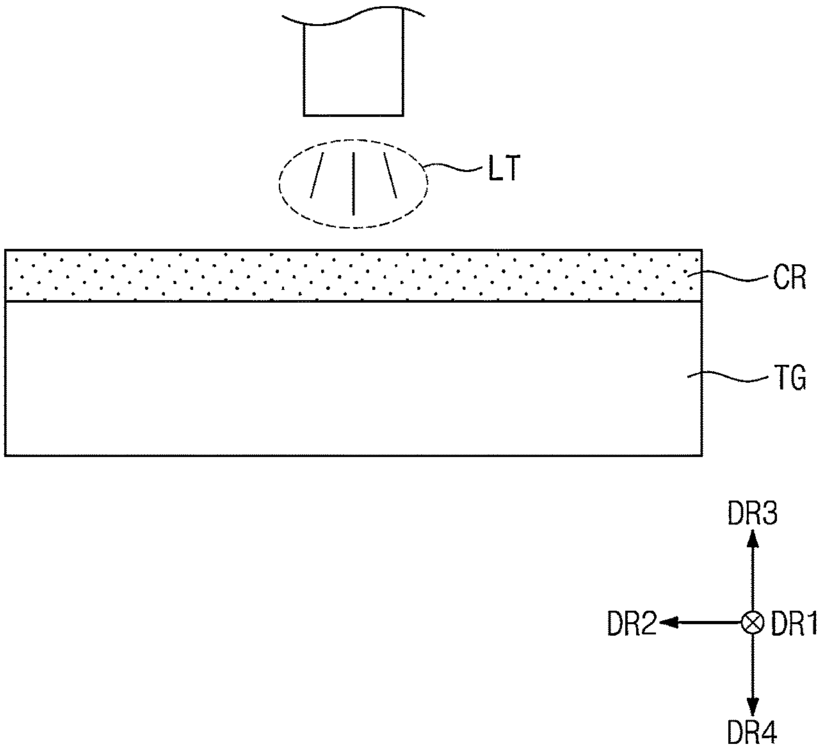
FIG. 6B is a view schematically illustrating an embodiment of a method of producing a hard coating layer of a window according to the invention.

Each of FIGS. 5A to 5C illustrates a cross-sectional view of a window of an embodiment. FIGS. 6A and 6B are views schematically illustrating a method of forming a hard coating layer of a window of an embodiment.

Referring to FIGS. 5A to 5C, FIG. 6A, and FIG. 6B, the windows WM, WM-1, and WM-2 in embodiments may include a glass substrate TG and hard coating layers UCL and BCL disposed on at least one of the upper portion and the lower portion of the glass substrate TG. In an embodiment, the window WM illustrated in FIG. 5A may include the glass substrate TG and a first hard coating layer UCL disposed on an upper portion of the glass substrate TG, the window WM-1 illustrated in FIG. 5B may include the glass substrate TG and a second hard coating layer BCL disposed on a lower portion of the glass substrate TG, or the window WM-2 illustrated in FIG. 5C may include the glass substrate TG, the first hard coating layer UCL disposed on the upper portion of the glass substrate TG, and the second hard coating layer BCL disposed on the lower portion of the glass substrate TG, for example.

In the windows WM, WM-1, and WM-2 of embodiments, the glass substrate TG may be a tempered glass substrate. The glass substrate TG may have a thickness $T_{TG}$ of about 30 micrometers (μm) to about 100 μm. However, this is merely one of embodiments, and the invention is not limited thereto. In an embodiment, the thickness $T_{TG}$ of the glass substrate TG may be applied without limitation as long as it is possible to achieve good folding properties and excellent mechanical properties, for example.

Although the hard coating layers UCL and BCL are divided into the first hard coating layer UCL disposed on the upper portion of the glass substrate TG and the second hard coating layer BCL disposed on the lower portion of the glass substrate TG, the upper portion and lower portion of the glass substrate TG are expressed on the basis of the glass substrate TG illustrated in FIGS. 5A to 5C, and the invention is not limited thereto.

In an embodiment, the hard coating layer CL may include a coating polymer derived from a hard coating composition including a silica-silsesquioxane-based resin, a photoinitiator, and a diluting monomer. The diluting monomer may include at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer. In an embodiment, the diluting monomer may include a 2-hydroxyethyl acrylate monomer and a tetrahydrofurfuryl acrylic acid monomer, for example.

The windows WM, WM-1 and WM-2 in embodiments may include, in at least one of the upper portion and the lower portion of the glass substrate TG, the hard coating layers UCL and BCL including or consisting of the coating polymer derived from the hard coating composition including the silica-silsesquioxane-based resin, the photoinitiator, and the diluting monomer, thereby having good folding properties and excellent mechanical properties.

The hard coating layers UCL and BCL may have thicknesses $T_U$ and $T_B$, respectively, of about 20 μm to about 40 μm. When the thicknesses $T_U$ and $T_B$ of the hard coating layers UCL and BCL are less than about 20 μm, the windows WM, WM-1, and WM-2 may have a decrease in impact resistance. When the thicknesses $T_U$ and $T_B$ of the hard coating layers UCL and BCL are greater than about 40 μm, the windows WM, WM-1, and WM-2 may have a decrease in folding properties.

When the window WM-2 of an embodiment includes both the first hard coating layer UCL and the second hard coating layer BCL, the thickness $T_U$ of the first hard coating layer UCL and the thickness $T_B$ of the second hard coating layer BCL may be the same as or different from each other.

The hard coating layers UCL and BCL may be formed from a hard coating composition CR. As illustrated in FIG. 6A, the hard coating composition CR may be applied on the glass substrate TG, and then as illustrated in FIG. 6B, the hard coating composition CR applied on the glass substrate TG may be irradiated with light LT to form the hard coating layers UCL and BCL. In an embodiment, the hard coating layers UCL and BCL may be formed by curing the hard coating composition CR with ultraviolet light, for example.

The hard coating composition CR may not include a solvent. As the hard coating composition CR does not include a solvent, the hard coating layers UCL and BCL may be formed without a process of removing the solvent, and thus there is an effect of reducing process time and costs.

The hard coating composition RC may include a silica-silsesquioxane-based resin, a photoinitiator, and a diluting monomer. The diluting monomer may include at least one of a 2-hydroxyethyl acrylate monomer, a tetrahydrofurfuryl acrylic acid monomer, an isobornyl acrylate monomer, a cyclic trimethylolpropane formal acrylate monomer, and an acryloylmorpholine monomer.

The silica-silsesquioxane-based resin may exclude a solvent. The hard coating composition CR may exclude a solvent. The hard coating composition CR may include the diluting monomer to have a low viscosity characteristic even though the hard coating composition CR does not include a solvent.

In an embodiment, the hard coating composition CR may have a viscosity of about 10 centipoise (cps) to about 30 cps at room temperature (about 25 degrees Celsius (° C.)). When the hard coating composition CR has a viscosity of less than about 10 cps, there is a limitation on forming the thick hard coating layers UCL and BCL on the glass substrate TG. When the hard coating composition CR has a viscosity of greater than about 30 cps, there is a disadvantage of the occurrence of bending on the surface of the formed hard coating layers UCL and BCL.

In the hard coating composition, the silica-silsesquioxane-based resin may be represented by Formula A below:

Formula A

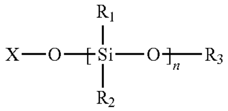

In Formula A, n may be an integer of 1 to 100, X may be silica ($SiO_2$), aluminum oxide ($Al_2O_3$), zirconium oxide ($ZrO_2$), titanium oxide ($TiO_2$), zinc oxide (ZnO), aluminum nitride (AlN), or silicon nitride ($Si_3N_4$).

In Formula A, at least one among $R_1$ to $R_3$ may be represented by Formula B, and the rest may be each independently a substituted or unsubstituted alkyl group having 1 to 6 carbon atoms, a substituted or unsubstituted alkoxy group having 1 to 6 carbon atoms, or a hydroxy group, or represented by Formula B or Formula C. In an embodiment, in Formula A, $R_1$ to $R_3$ may all be represented by Formula B, or any one among $R_1$ to $R_3$ may be represented by Formula B, or two among $R_1$ to $R_3$ may be represented by Formula B, for example.

Formula B

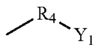

Formula C

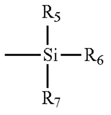

In Formula C, $R_5$ to $R_7$ may be each independently a substituted or unsubstituted alkyl group having 1 to 6 carbon atoms, or a hydroxy group.

In Formula B, $R_4$ may be a substituted or unsubstituted bivalent alkyl group having 1 to 6 carbon atoms. In Formula B, $Y_1$ may be represented by Formula D or Formula E.

Formula D

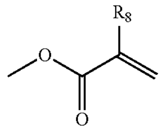

Formula E

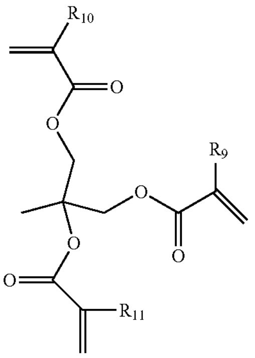

In Formula D, $R_8$ may be a hydrogen atom, or a substituted or unsubstituted methyl group. In Formula E, $R_9$ to $R_{11}$ may be each independently a hydrogen atom, or a substituted or unsubstituted methyl group. In an embodiment, $R_9$ to $R_{11}$ may be all the same, or at least one among $R_9$ to $R_{11}$ may be different from the others, for example.

In the specification, the term "substituted or unsubstituted" may mean substituted or unsubstituted with at least one substituent selected from the group or including or consisting of a deuterium atom, a halogen atom, a cyano group, a nitro group, an amino group, a silyl group, an oxy group, a thio group, a sulfinyl group, a sulfonyl group, a carbonyl group, a boron group, a phosphine oxide group, a phosphine sulfide group, an alkyl group, an alkenyl group, an alkynyl group, an alkoxy group, a hydrocarbon ring group, an aryl group, and a heterocyclic group. In addition, each of the substituents exemplified above may be substituted or unsubstituted. In an embodiment, a biphenyl group may be interpreted as an aryl group or a phenyl group substituted with a phenyl group, for example.

The hard coating composition CR of an embodiment may be cured when the photoinitiator is activated by light LT, thereby forming the hard coating layers UCL and BCL. Specifically, when the hard coating composition CR is irradiated with the light LT, the photoinitiator may be activated to initiate the polymerization of the diluting monomer and the silica-silsesquioxane-based resin. That is, the hard coating composition CR may be irradiated with the light LT to form the hard coating layers UCL and BCL including or consisting of the coating polymer.

The photoinitiator may be activated by the light LT to be radicalized. The radicalized photoinitiator may radicalize the diluting monomer. The photoinitiator may be activated by the light LT in an ultraviolet light region. In an embodiment, the photoinitiator may be activated by the light LT in a wavelength range of about 230 nanometer (nm) to about 410 nm, for example.

In an embodiment, the photoinitiator may include a first photoinitiator that is activated by light in a wavelength range of about 360 nm to about 410 nm and a second photoinitiator that is activated by light in a wavelength range of about 230 nm to about 310 nm. When the hard coating composition CR is provided in a method such as coating, the first photoinitiator may be activated on the surface of the hard coating composition, and the second photoinitiator may be activated in the deep part of the hard coating composition. In an embodiment, the first photoinitiator may be a diphenyl(2,4,6-trimethylbenzoyl)phosphine oxide, and the second photoinitiator may be a (1-hydroxycyclohexyl)phenylmethanone, for example. However, this is merely one of embodiments, and the invention is not limited thereto.

In an embodiment, the hard coating composition CR may include about 2 weight percent (wt %) to about 22 wt % of a silica-silsesquioxane-based resin, about 40 wt % to about 80 wt % of a diluting monomer, and about 1 wt % to about 5 wt % of a photoinitiator with respect to a total weight of the hard coating composition CR. When the hard coating composition CR includes less than about 2 wt % of a silica-silsesquioxane-based resin with respect to the total weight of the hard coating composition CR, the hardness of the formed hard coating layers UCL and BCL may be low. When the hard coating composition CR includes greater than about 22 wt % of a silica-silsesquioxane-based resin with respect to the total weight of the hard coating composition CR, the flexibility of the formed hard coating layers UCL and BCL may be low.

When the hard coating composition CR includes less than about 40 wt % of a diluting monomer of with respect to the total weight of the hard coating composition CR, the viscosity of the hard coating composition CR is high, and thus there is a limitation on forming the hard coating layers UCL and BCL in at least a suitable thickness on the glass substrate TG. When the hard coating composition CR includes greater than about 60 wt % of a diluting monomer with respect to the total weight of the hard coating composition CR, the viscosity of the hard coating composition CR is low, and thus the curved surface may occur on the surface of the formed hard coating layers UCL and BCL.

In an embodiment, the hard coating composition CR may include about 2 wt % to about 22 wt % of a silica-silsesquioxane-based resin, about 27 wt % to about 47 wt % of a hydroxymethyl acrylate monomer, about 13 wt % to about 33 wt % of a tetrahydrofurfuryl acrylic acid monomer, and about 1 wt % to about 5 wt % of a photoinitiator with respect to the total weight of the hard coating composition CR. The hard coating composition CR of an embodiment may include about 27 wt % to about 47 wt % of a hydroxymethyl acrylate monomer and about 13 wt % to about 33 wt % of a tetrahydrofurfuryl acrylic acid monomer with respect to the total weight of the hard coating composition CR, thereby having a low viscosity characteristic.

When the hard coating composition CR includes less than about 27 wt % of a hydroxymethyl acrylate monomer and less than about 13 wt % of a tetrahydrofurfuryl acrylic acid monomer with respect to the total weight of the hard coating composition CR, the viscosity of the hard coating composition CR may be increased, and there may be a limitation on forming the hard coating layers UCL and BCL in at least a suitable thickness. When the hard coating composition CR includes greater than about 47 wt % of a hydroxymethyl acrylate monomer and greater than about 33 wt % of a tetrahydrofurfuryl acrylic acid monomer with respect to the total weight of the hard coating composition CR, the viscosity of the hard coating composition CR is low, and thus the curve may occur on the surface of the formed hard coating layers UCL and BCL.

In an embodiment, the hard coating composition CR may further include a photosensitizer. The radicalization of the diluting monomer may be facilitated by the photosensitizer, and the formation of the coating polymer may be facilitated to shorten the formation time of the hard coating layers UCL and BCL.

In addition, the photosensitizer may expand the wavelength range of light by which the photoinitiator is activated. That is, the hard coating composition CR of an embodiment may further include the photosensitizer, and thus the wavelength range of light provided for curing the hard coating composition CR of an embodiment may be expanded.

The hard coating composition CR of an embodiment may include 2-isopropylthioxanthone as a photosensitizer. However, this is merely one of embodiments, and the invention is not limited thereto. In an embodiment, the photosensitizer may be used without limitation as long as it is a material that may facilitate the radicalization of a monomer, for example.

The hard coating composition CR of an embodiment may include about 0.1 wt % to about 1.0 wt % of a photosensitizer with respect to the total weight of the hard coating composition CR. When the hard coating composition CR includes less than about 0.1 wt % of a photosensitizer with respect to the total weight of the hard coating composition CR, the effect of facilitating the radicalization of the monomer is slight. When the hard coating composition CR includes greater than about 1.0 wt % of a photosensitizer with respect to the total weight of the hard coating composition CR, there is a limitation of an increase in yellow index (YI) of the hard coating layers UCL and BCL formed by the hard coating composition CR.

In an embodiment, the hard coating composition CR may further include an adhesion enhancer. The adhesion enhancer may serve to compensate adhesive strength between the glass substrate TG and the hard coating layers UCL and BCL formed by the hard coating composition CR. In an embodiment, the hard coating composition CR of an embodiment may include trimethoxy-[3-(oxyranylmethoxy) propyl]silane and bis[2-(methacryloyloxy)ethyl] phosphate as an adhesion enhancer, for example. However, this is merely one of embodiments, and the invention is not limited thereto. In an embodiment, the adhesion enhancer may be used without limitation as long as it is a material that may compensate adhesive strength between the glass substrate TG and the hard coating layers UCL and BCL formed by the hard coating composition CR, for example.

In an embodiment, the hard coating composition CR may include about 11 wt % to about 31 wt % of an adhesion enhancer with respect to the total weight of the hard coating composition CR. In an embodiment, when the hard coating composition CR includes less than about 11 wt % of an adhesion enhancer with respect to the total weight of the hard coating composition CR, the adhesion enhancer may not serve to compensate adhesive strength between the glass substrate TG and the hard coating layers UCL and BCL. In an embodiment, when the hard coating composition CR includes greater than about 31 wt % of an adhesion enhancer with respect to the total weight of the hard coating composition CR, defects may occur on the outer appearance of the hard coating layers UCL and BCL formed by the hard coating composition CR.

In an embodiment, the hard coating composition CR may include about 7 wt % to about 17 wt % of trimethoxy-[3-(oxyranylmethoxy)propyl]silane and about 4 wt % to about 14 wt % of bis[2-(methacryloyloxy)ethyl] phosphate with respect to the total weight of the hard coating composition CR.

In an embodiment, the hard coating composition CR may further include at least one of siloxane and silicone. The hard coating layers UCL and BCL formed by the hard coating composition CR further including at least one of siloxane and silicone has a good surface quality and excellent surface wetting characteristics.

The hard coating composition CR of an embodiment may include about 0.1 wt % to about 1.0 wt % of at least one of siloxane and silicone with respect to the total weight of the hard coating composition CR. When the hard coating composition (CR) includes less than about 0.1 wt % of at least one of siloxane and silicone with respect to the total weight of the hard coating composition CR, or includes greater than about 1.0 wt % of at least one of siloxane and silicone with respect to the total weight of the hard coating composition CR, there are limitations in that the surface quality characteristics of the hard coating layers UCL and BCL formed by the hard coating composition CR may be deteriorated or the surface wetting characteristics may not be achieved.

In an embodiment, the hard coating composition CR may include at least one of a polyester-based resin, a urethane-based resin, a polyurea-based resin, and an epoxy-based resin. In the hard coating composition CR, at least one of the polyester-based resin, the urethane-based resin, the polyurea-based resin, and the epoxy-based resin may function as an organic binder. The hard coating layers UCL and BCL formed by the hard coating composition CR including at least one of the polyester-based resin, the urethane-based resin, the polyurea-based resin, and the epoxy-based resin may have good flexibility.

The hard coating composition CR of an embodiment may include about 5.0 wt % to about 15.0 wt % of at least one of a polyester-based resin, a urethane-based resin, a polyurea-based resin, and an epoxy-based resin with respect to the total weight of the hard coating composition CR. When the hard coating composition CR includes less than 5.0 wt % of at least one of a polyester-based resin, a urethane-based resin, a polyurea-based resin, and an epoxy-based resin with respect to the total weight of the hard coating composition CR, there may be less effect of improving the flexibility of the hard coating layers UCL and BCL formed by the hard coating composition CR. When the hard coating composition CR includes greater than about 15.0 wt % of at least one of a polyester-based resin, a urethane-based resin, a polyurea-based resin, and an epoxy-based resin with respect to the total weight of the hard coating composition CR, the impact resistance of the formed hard coating layers UCL and BCL may be small.

In an embodiment, the hard coating composition CR may further include at least one of a nanosilica, a porous silica, a zirconium oxide, an aluminum oxide, and a core-shell rubber. In an embodiment, at least one of the nanosilica, the porous silica, the zirconium oxide, the aluminum oxide, and the core-shell rubber included in the hard coating composition CR may serve to absorb an impact. That is, the hard coating layers UCL and BCL formed by the hard coating composition CR including the nanosilica, the porous silica, the zirconium oxide, the aluminum oxide, and the core-shell rubber may have an improvement in impact absorption characteristics.

The nanosilica, the porous silica, the zirconium oxide, the aluminum oxide, and the core-shell rubber may have an average particle diameter of about 5 nm to about 150 nm. When the nanosilica, the porous silica, the zirconium oxide, the aluminum oxide, and the core-shell rubber may have an average particle diameter of less than about 5 nm, the hard coating layers UCL and BCL including or consisting of the hard coating composition CR has less effect of improving an impact absorption function. When the nanosilica, the porous silica, the zirconium oxide, the aluminum oxide, and the core-shell rubber may have an average particle diameter of greater than about 150 nm, there is a limitation in that haze occurs on the surface of the hard coating layers UCL and BCL including or consisting of the hard coating composition CR.

The hard coating composition CR of an embodiment may include about 5.0 wt % to about 15.0 wt % of at least one of a nanosilica, a porous silica, a zirconium oxide, an aluminum oxide and a core-shell rubber with respect to the total weight of the hard coating composition CR.

When the hard coating composition CR includes less than about 5.0 wt % of a nanosilica, a porous silica, a zirconium oxide, an aluminum oxide, and a core-shell rubber with respect to the total weight of the hard coating composition CR, the hard coating layers UCL and BCL including or consisting of the hard coating composition CR may not serve to absorb an impact. When the hard coating composition CR includes greater than about 15.0 wt % of a nanosilica, a porous silica, a zirconium oxide, an aluminum oxide, and a core-shell rubber with respect to the total weight of the hard coating composition CR, the surface quality of the hard coating layers UCL and BCL including or consisting of the hard coating composition CR may be deteriorated.

Figure 7A:
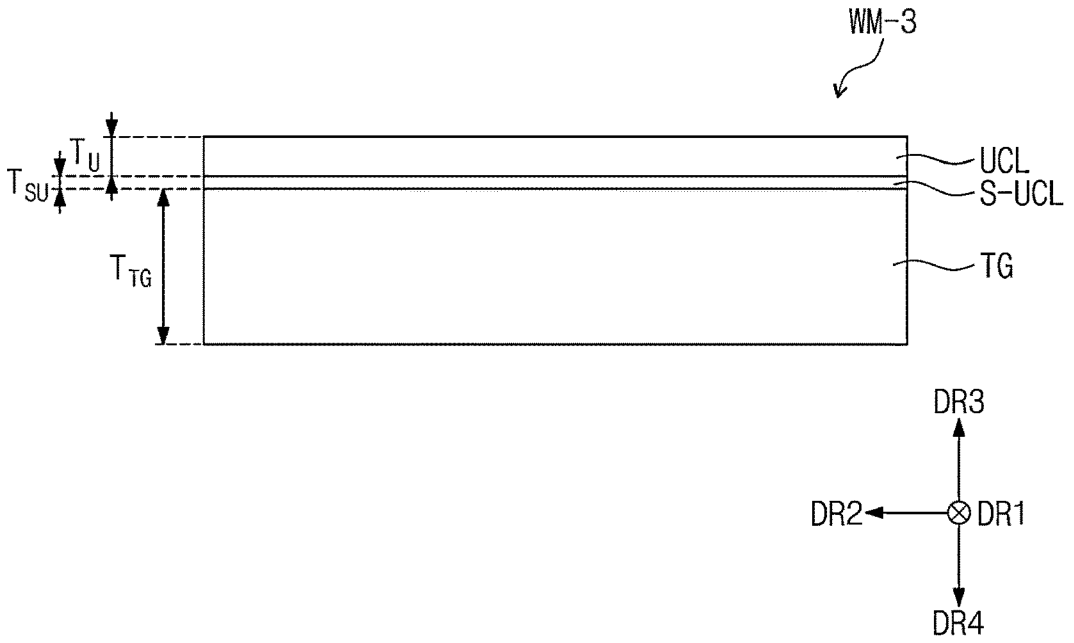
FIG. 7A illustrates a cross-sectional view of an embodiment of a window according to the invention.
Figure 7B:
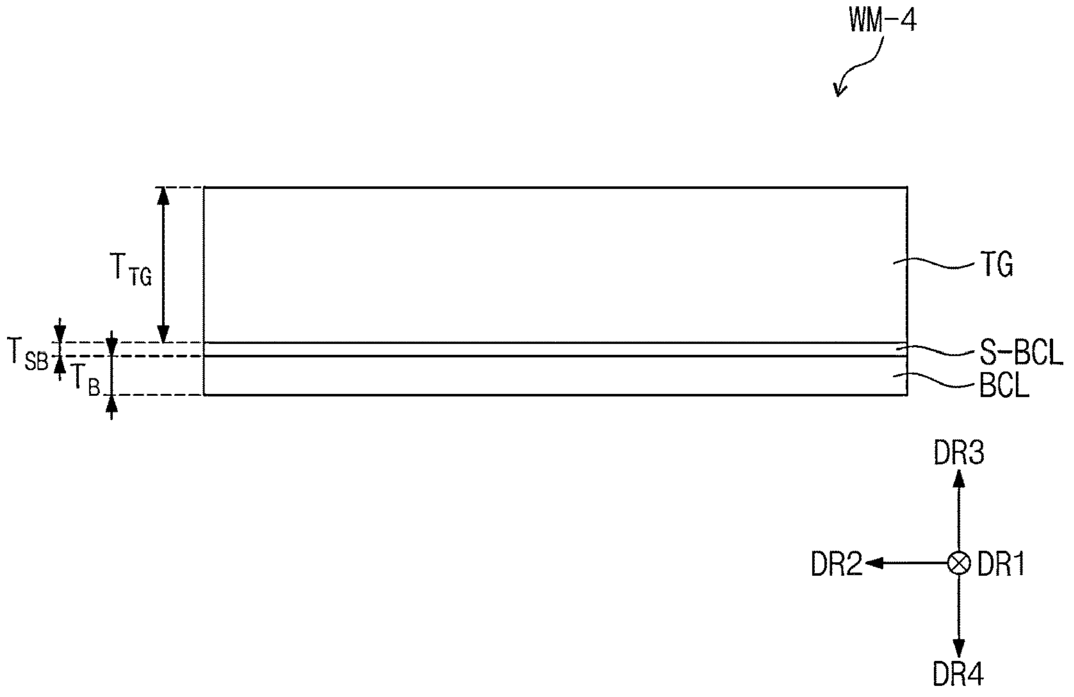
FIG. 7B illustrates a cross-sectional view of an embodiment of a window according to the invention.
Figure 7C:
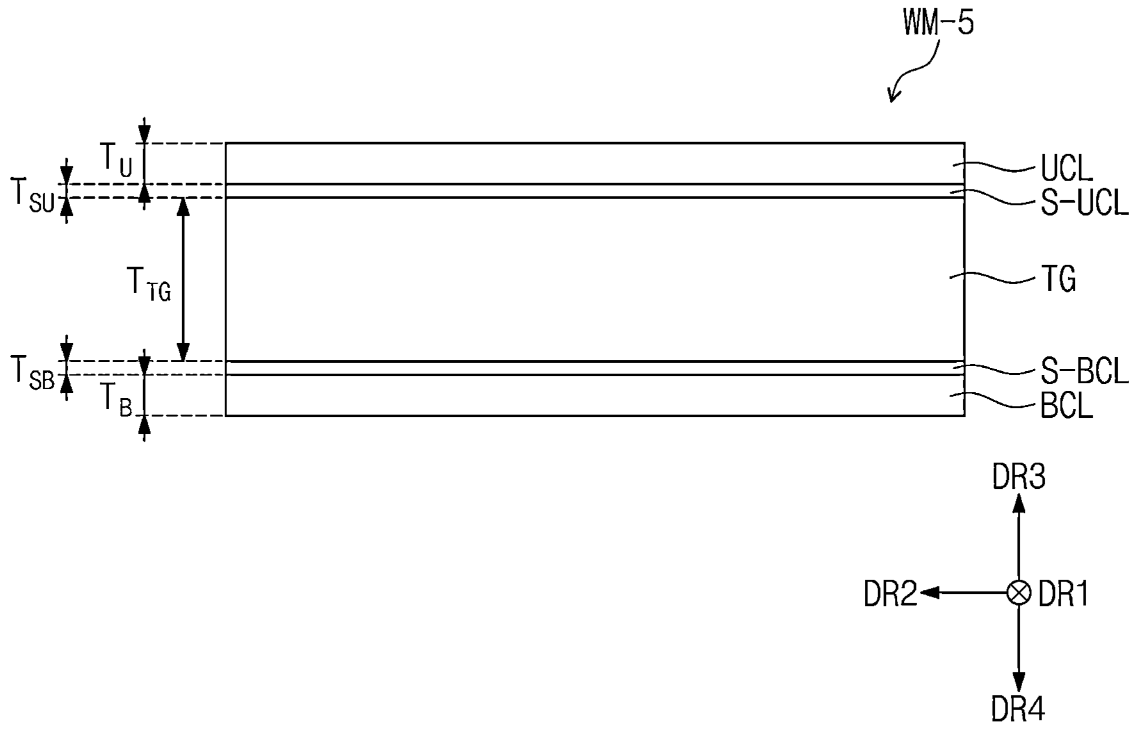
FIG. 7C illustrates a cross-sectional view of an embodiment of a window according to the invention.

Each of FIGS. 7A to 7C illustrates a cross-sectional view of a window of an embodiment. Hereinafter, the same descriptions as described with reference to FIGS. 1 to 6D will not be described again, and the differences will be mainly described.

Windows WM-3, WM-4, and WM-5 of embodiments illustrated in FIGS. 7A to 7C differ from the windows WM, WM-1, and WM-2 illustrated in FIGS. 5A to 5C in further including auxiliary coating layers S-UCL and S-BCL between the glass substrate TG and the hard coating layers UCL and BCL, respectively.

Referring to FIGS. 7A to 7C, the windows WM-3, WM-4, and WM-5 of embodiments may further include the auxiliary coating layers S-UCL and S-BCL between the glass substrate TG and the hard coating layer UCL and between the glass substrate TG and the hard coating layer BCL, respectively. As illustrated in FIG. 7A, the window WM-3 of an embodiment may include a glass substrate TG, a first hard coating layer UCL disposed on an upper portion of the glass substrate TG, and a first auxiliary coating layer S-UCL disposed between the glass substrate TG and the first hard coating layer UCL. As illustrated in FIG. 7B, the window WM-4 of an embodiment may include a glass substrate TG, a second hard coating layer BCL disposed on a lower portion of the glass substrate TG, and a second auxiliary coating layer S-BCL disposed between the glass substrate TG and the second hard coating layer BCL. As illustrated in FIG. 7C, the window WM-5 of an embodiment may include a glass substrate TG, a first hard coating layer UCL disposed on an upper portion of the glass substrate TG, a second hard coating layer BCL disposed on a lower portion of the glass substrate TG, a first auxiliary coating layer S-UCL disposed between the glass substrate TG and the first hard coating layer UCL, and a second auxiliary coating layer S-BCL disposed between the glass substrate TG and the second hard coating layer BCL.

The auxiliary coating layers S-UCL and S-BCL may include different materials from that of the hard coating layers UCL and BCL. The auxiliary coating layers S-UCL and S-BCL may include perhydro-polysilazane, a silane coupling agent, or a self-healing polymer. The auxiliary coating layers S-UCL and S-BCL may enhance adhesive strength between the hard coating layers UCL and BCL and the glass substrate TG, or enhance the mechanical properties of the windows WM-3, WM-4, and WM-5 including the auxiliary coating layers S-UCL and S-BCL.

In an embodiment, the thicknesses $T_{SU}$ and $T_{SB}$ of the auxiliary coating layers S-UCL and S-BCL, respectively, may be smaller than the thicknesses $T_U$ and $T_B$ of the hard coating layers UCL and BCL. When the thicknesses $T_{SU}$ and $T_{SB}$ of the auxiliary coating layers S-UCL and S-BCL, respectively, are greater than the thicknesses $T_U$ and $T_B$ of the hard coating layers UCL and BCL, there may be a limitation in a process of forming the hard coating layers UCL and BCL on the auxiliary coating layers S-UCL and S-BCL, respectively.

In an embodiment, the thicknesses $T_U$ and $T_B$ of the hard coating layers UCL and BCL may be about 10 μm to about 30 μm, and the thicknesses $T_{SU}$ and $T_{SB}$ of the auxiliary coating layers S-UCL and S-BCL may be about 5 μm to about 10 μm. When the thicknesses $T_{SU}$ and $T_{SB}$ of the auxiliary coating layers S-UCL and S-BCL are less than about 5 μm, the impact resistance effect by the auxiliary coating layers S-UCL and S-BCL may be deteriorated. When the thicknesses $T_{SU}$ and $T_{SB}$ of the auxiliary coating layers S-UCL and S-BCL are greater than about 10 μm, there may be a limitation in a process of forming the hard coating layers UCL and BCL on the auxiliary coating layers S-UCL and S-BCL, respectively.

Hereinafter, a method of producing the hard coating composition to an embodiment will be described in detail with reference to FIGS. 8 to 10. The duplicated features which have been described with reference to FIGS. 1 to 7C are not described again, and features of the producing method will be mainly described.

Figure 8:
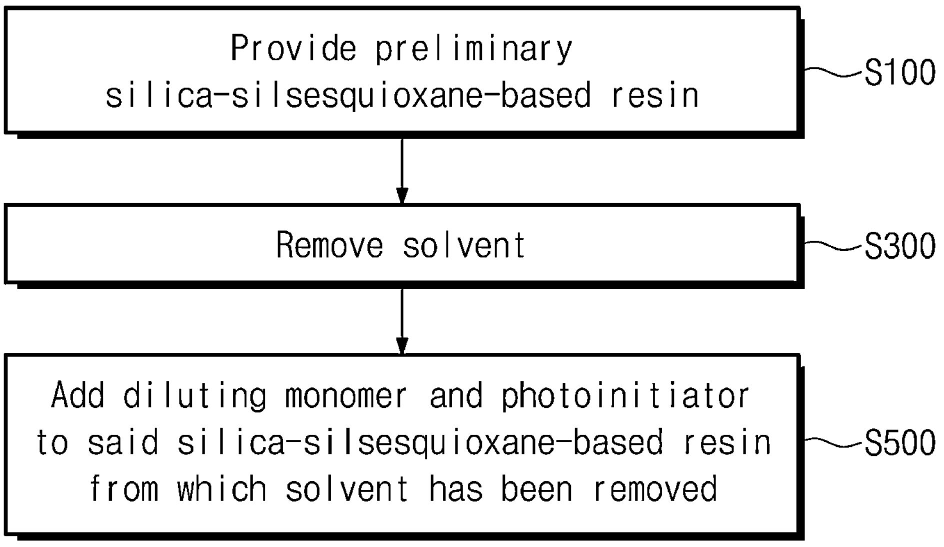
FIG. 8 is a flowchart of an embodiment of a method of producing a hard coating composition according to the invention.

FIG. 8 is a flowchart of a method of producing a hard coating composition. FIG. 9 is a view schematically illustrating an operation of a method of producing a hard coating composition. FIG. 10 is a view schematically illustrating an operation of a method of producing a hard coating composition.

Referring to FIG. 8, the method of producing a hard coating composition in an embodiment may include providing a preliminary silica-silsesquioxane-based resin (S100), removing a solvent (S300), and adding a diluting monomer and a photoinitiator to the silica-silsesquioxane-based resin from which the solvent has been removed (S500). A preliminary silica-silsesquioxane-based resin P-RS (refer to FIG. 9) may include a silica-silsesquioxane-based resin RS (refer to FIG. 10) and a solvent. The silica-silsesquioxane-based resin RS (refer to FIG. 10) may be represented by Formula A as described above.

Figure 9:
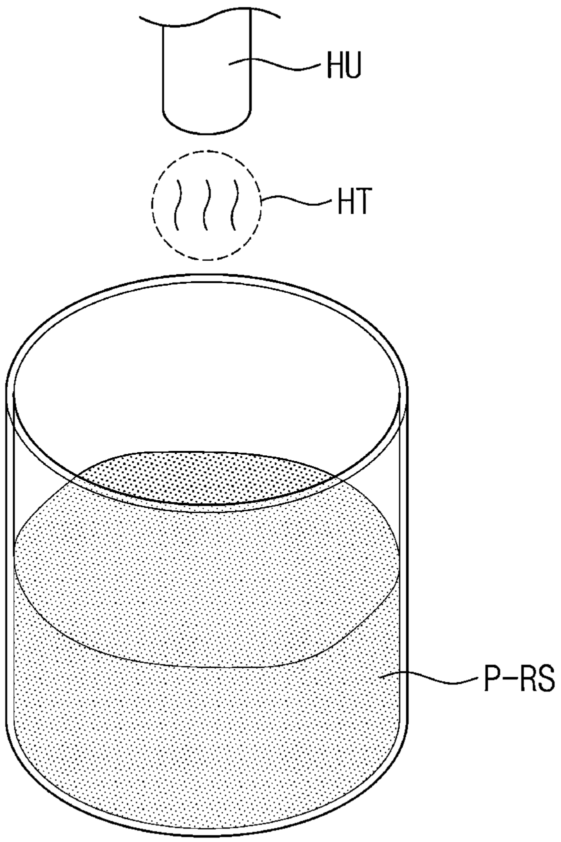
FIG. 9 is a view schematically illustrating an embodiment of an operation of a method of producing a hard coating composition according to the invention.

FIG. 9 is a view schematically illustrating the removing of the solvent (S300) in the method of producing a hard coating composition. Referring to FIG. 9, the removing of the solvent (S300) may provide heat HT by a heating unit HU for the preliminary silica-silsesquioxane-based resin P-RS. In an embodiment, the removing of the solvent (S300) may heat the preliminary silica-silsesquioxane-based resin P-RS at a temperature of about 40° C. to about 60° C.

Figure 10:
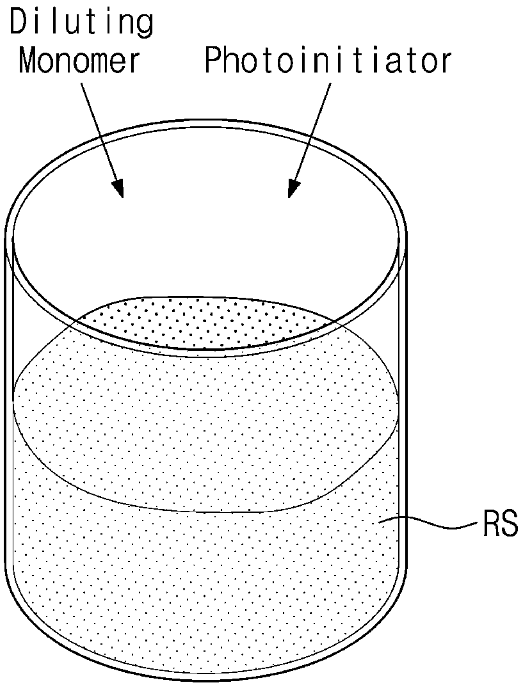
FIG. 10 is a view schematically illustrating an embodiment of an operation of a method of producing a hard coating composition according to the invention.

FIG. 10 is a view schematically illustrating the adding of the diluting monomer and the photoinitiator to the silica-silsesquioxane-based resin from which the solvent has been removed (S500) in the method of producing a hard coating composition. Referring to FIG. 10, the adding of the diluting monomer and the photoinitiator to the silica-silsesquioxane-based resin from which the solvent has been removed (S500) may be adding the diluting monomer and the photoinitiator to the silica-silsesquioxane-based resin RS from which the solvent has been removed to form a hard coating composition CR (refer to FIG. 6A). The same as describing the hard coating composition CR (refer to FIG. 6A) of an embodiment as described above may be applied to the photoinitiator and the diluting monomer.

In an embodiment, the adding of the diluting monomer and the photoinitiator to the silica-silsesquioxane-based resin RS from which the solvent has been removed (S500) may include adding a photosensitizer. The same as describing the hard coating composition CR (refer to FIG. 6A) of an embodiment as described above may be applied to the photosensitizer.

In an embodiment, the adding of the diluting monomer and the photoinitiator to the silica-silsesquioxane-based resin RS from which the solvent has been removed (S500) may include at least one of adding trimethoxy-[3-(oxyranylmethoxy)propyl]silane and bis[2-(methacryloyloxy)ethyl] phosphate, adding siloxane and silicone, or adding at least one of polyester, urethane, polyurea, epoxy, a nanosilica, a porous silica, a zirconium oxide, an aluminum oxide, and a core-shell rubber. The same as described in FIGS. 5A to 6B may be applied to the trimethoxy[3-(oxyranylmethoxy)propyl]silane, bis[2-(methacryloyloxy)ethyl] phosphate, siloxane, silicone, polyester, urethane, polyurea, epoxy, nanosilica, porous silica, zirconium oxide, aluminum oxide, and core-shell rubber.

Hereinafter, an embodiment of the invention will be described in detail by comparing a detailed embodiment with a comparative example. The following embodiment is merely illustrative, and the embodiment of the invention is not limited to the following embodiment.

EXAMPLES

Physical properties of the electronic device including the window of an example including the hard coating composition of an example were evaluated. The electronic device has a stacked structure illustrated in FIG. 4, and the window included in the electronic device includes a window including at least one hard coating layer as illustrated in FIGS. 5A to 5C. Comparative Example has the same stacked structure as Examples except that the window excludes the hard coating layer.

(1) Pen Drop Evaluation 1

The results of pen drop evaluation 1 of Comparative Example and Examples 1 to 3 are listed in Table 1 below:

TABLE 1

| Evaluation Condition | Comparative Example | Example 1 | Example 2 | Example 3 |
|---|---|---|---|---|
| Bright spot (cm) | 10 | 12 | 14 | 13 |
| Crack (cm) | 12 | 17 | 22 | 23 |

(Subject of Pen Drop Evaluation)

In Table 1, Comparative Example is an electronic device including a window that excludes a hard coating layer, and each of Examples 1 to 3 is an electronic device including a window that includes a second hard coating layer as illustrated in FIG. 5B. The second hard coating layer is adjacent to a display module on the basis of FIG. 4. The thicknesses of the second hard coating layers included in Example 1, Example 2, and Example 3 are about 20 μm, about 30 μm, and about 40 μm, respectively.

(Method of Pen Drop Evaluation)

In a method of pen drop evaluation, a pen dropped at a predetermined height, the height at which a bright spot or crack is generated was then measured five times, and then an average height value of the five times was evaluated. A pen having a weight of about 5.8 gram (g) and a diameter of about 0.5 pi (π) was used in the pen drop evaluation in Table 1.

(Results of Pen Drop Evaluation)

As comparing Comparative Example with Examples 1 to 3, it may be confirmed that the pen drop heights at which the bright spot and crack are generated in Examples 1 to 3 are higher than the pen drop height at which the bright spot and crack are generated in Comparative Example. Accordingly, it may be confirmed that including the second hard coating layer improves the hardness of the window.

In addition, as comparing Examples 1 to 3, it may be confirmed that the case of the second hard coating layer having a thickness of about 30 μm has a pen drop height, at which the bright spot is generated, higher than the case of the second hard coating layer having a thickness of about 20 μm, and the case of the second hard coating layer having a thickness of about 40 μm has a pen drop height, at which the bright spot is generated, lower than the case of the second hard coating layer having a thickness of about 30 μm. Accordingly, it may be confirmed that as the second hard coating layer becomes thicker, the impact resistance of the window does not continually increase.

(2) Pen Drop Evaluation 2

The results of pen drop evaluation 2 of Comparative Example and Examples 4 and 5 are listed in Table 2 below:

TABLE 2

| | | | Comparative Example | Example 4 | | Example 5 | |
|---|---|---|---|---|---|---|---|
| Item Item | Evaluation method Evaluation method | | Minimum height | Minimum height | Average height | Minimum height | Average height |
| Pen drop | Bright spot (cm) | Unfolded state | 6 | 8 | 9.6 | 6 | 8.2 |
| Pen drop | Bright spot (cm) | Folded state | 4 | 5 | 7.2 | 4 | 4.6 |
| Pen drop | Crack (cm) | Unfolded state | 7 | 11 | 11.2 | 13 | 13.4 |
| Pen drop | Crack (cm) | Folded state | 5 | 11 | 11.0 | 12 | 13.0 |

(Subject of Pen Drop Evaluation)

In Table 1, Comparative Example is an electronic device including a window that excludes a hard coating layer, and Example 4 is an electronic device including a window that includes a first hard coating layer and a second hard coating layer as illustrated in FIG. 5C. Example 5 is an electronic device including a window that includes a second hard coating layer as illustrated in FIG. 5B. The first hard coating layer is adjacent to an upper protective layer, and the second hard coating layer is adjacent to a display module on the basis of FIG. 4.

(Method of Pen Drop Evaluation)

In a method of pen drop evaluation, a pen dropped at a predetermined height, the height at which a bright spot or crack is generated was then measured five times, and then an average height value of the five times was evaluated. A pen having a weight of about 5.8 g and a diameter of about 0.5 π was used in the pen drop evaluation in Table 2. The pen drop evaluation was performed in each of the non-folded state and folded state.

(Results of Pen Drop Evaluation)

As comparing Comparative Example with Examples 4 and 5, it may be seen that in each of the non-folded state and folded state, the minimum height and average height of pen drop at which the bright spot and crack are generated in Examples 4 and 5 are mostly higher respectively than the minimum height and average height of pen drop at which the bright spot and crack are generated in Comparative Example. Accordingly, it may be confirmed that the window has an increase in impact resistance in both cases where the window includes the hard coating layer on both surfaces or one surface thereof. In addition, it may be confirmed that even in the folded state, the window including the hard coating layer maintains impact resistance.

(3) Evaluation of Folding Properties

The results of folding operation evaluation and evaluation of properties in the folded state with respect to the electronic device of Example are listed in Table 3 below:

TABLE 3

| Evaluation Item | Evaluation Condition | | Evaluation quantity | Evaluation Result |
|---|---|---|---|---|
| Folding operation evaluation | 60° C. | 150 thousand times folding | 8 | O |
| Folding operation evaluation | −20° C. | 30 thousand times folding | 8 | O |
| Folding operation evaluation | 60° C./ 93% (Relative humidity) | 70 thousand times folding | 8 | O |
| Evaluation of properties in folded state | −40° C. ↔ 85° C. | Repeating temperature changes 100 times | 10 | O |
| Evaluation of properties in folded state | −10° C. to 55° C./ 93% (Relative humidity) | Repeating temperature changes 10 times | 10 | O |
| Evaluation of properties in folded state | −40° C. | Maintaining temperature for 240 hours | 10 | O |
| Evaluation of properties in folded state | 60° C./ 93% (Relative humidity) | Maintaining temperature for 240 hours | 10 | O |

(Subject of Folding Property Evaluation)

The folding property evaluation listed in Table 3 was experimented with an electronic device including a window including a second hard coating layer as illustrated in FIG. 5B. The second hard coating layer is adjacent to a display module on the basis of FIG. 4.

(Method of Folding Property Evaluation)

For the folding operation evaluation of a window, an electronic device including the window was repeatedly folded about 150 thousand times at about 60° C., repeatedly folded about 30 thousand times at about −20° C., and repeatedly folded about 70 thousand times under the conditions of about 60° C. and a relative humidity of about 93%, and then a change in appearance such as window crack was evaluated. Each evaluation was performed with respect to eight electronic devices including windows that include hard coating layers.

In the property evaluation of the folded window, the folded electronic device was subjected to temperature changes 100 times between about −40° C. and about 85° C., the folded electronic device was subjected to temperature change 10 times between about −10° C. and about 55° C. under the condition of a relative humidity of about 93%, the folded electronic device was left at about −40° C. for 240 hours, and the folded electronic device was left under the conditions of a relative humidity of about 93% and a temperature of about 60° C., and then a change in appearance such as a window crack was evaluated. Each evaluation was performed with respect to ten electronic devices including windows that include hard coating layers.

(Results of Folding Property Evaluation)

As a result of the folding operation evaluation of the window, it was confirmed that there were no cracks and no changes in appearance of the window in all the cases where the folding operation was repeated 150 thousand times at about 60° C., the folding operation was repeated 30 thousand times at about −20° C., and the folding operation was repeated 70 thousand times under the conditions of about 60° C. and a relative humidity of about 93%. Accordingly, it may be confirmed that the window including the hard coating layer has good folding properties.

As a result of the property evaluation of the folded window, it was confirmed that there were no cracks and no changes in appearance of the window in all the cases where the folded electronic device was subjected to temperature changes 100 times between about −40° C. and about 85° C., the folded electronic device was subjected to temperature change 10 times between about −10° C. and about 55° C. under the condition of a relative humidity of about 93%, the folded electronic device was left at about −40° C. for 240 hours, and the folded electronic device was left under the conditions of a relative humidity of about 93% and a temperature of about 60° C. Accordingly, it may be confirmed that the window including the hard coating layer has good folding properties.

In summary of Tables 1 to 3, it may be confirmed that the window including the hard coating layer of an example has good folding properties and at the same time has excellent impact resistance.

The hard coating composition of an embodiment may include a silica-silsesquioxane-based resin, a photoinitiator, and a diluting monomer, thereby having a low viscosity characteristic.

The window of an embodiment may include a glass substrate, and a hard coating layer which is disposed on at least one of the upper portion and the lower portion of the glass substrate and includes a polymer derived from a hard coating composition including a silica-silsesquioxane-based resin, a diluting monomer, and a photoinitiator, thereby exhibiting good folding properties and excellent mechanical properties.

The method of producing a hard coating composition of an embodiment may include removing a solvent from a preliminary silica-silsesquioxane-based resin, and adding a photoinitiator and a diluting monomer to a silica-silsesquioxane-based resin from which the solvent has been removed, thereby providing the hard coating composition having a low viscosity characteristic without including a solvent.

A hard coating composition of an embodiment may include a silica-silsesquioxane-based resin, a photoinitiator, and a diluting monomer, thereby providing a hard coating layer having excellent surface hardness and flexibility.

A window of an embodiment may include the hard coating layer including or consisting of a coating polymer derived from a hard coating composition including a silica-silsesquioxane-based resin, a photoinitiator, and a diluting monomer, thereby having good folding properties and excellent mechanical properties.

Although the invention has been described with reference to a preferred embodiment of the invention, it will be understood that the invention should not be limited to these preferred embodiments but various changes and modifications may be made by those skilled in the art without departing from the spirit and scope of the invention.

Accordingly, the technical scope of the invention is not intended to be limited to the contents set forth in the detailed description of the specification, but is intended to be defined by the appended claims.

What is claimed is:

1. A hard coating composition comprising:

a resin including silica and silsesquioxane;

a photoinitiator; and a diluting monomer including a 2-hydroxyethyl acrylate monomer and a tetrahydrofurfuryl acrylic acid monomer, wherein the diluting monomer further includes at least one of an isobornyl acrylate monomer, a cyclic trimethylolpropane formal acrylate monomer, and an acryloylmorpholine monomer, wherein the resin further comprises a material which is aluminum oxide ($Al_2O_3$), zirconium oxide ($ZrO_2$), titanium oxide ($TiO_2$), zinc oxide (ZnO), aluminum nitride (AlN), or silicon nitride ($Si_3N_4$), and wherein the hard coating composition comprises about 27 weight percent to about 47 weight percent of the 2-hydroxyethyl acrylate monomer, and about 13 weight percent to about 33 weight percent of the tetrahydrofurfuryl acrylic acid monomer with respect to a total weight of the hard coating composition.

2. The hard coating composition of claim 1, wherein the resin excludes a solvent.

3. The hard coating composition of claim 1, comprising about 2 weight percent to about 22 weight percent of the resin, about 40 weight percent to about 80 weight percent of the diluting monomer, and about 1 weight percent to about 5 weight percent of the photoinitiator with respect to the total weight of the hard coating composition.

4. The hard coating composition of claim 1, comprising about 2 weight percent to about 22 weight percent of the resin, about 27 weight percent to about 47 weight percent of the 2-hydroxyethyl acrylate monomer, and about 13 weight percent to about 33 weight percent of the tetrahydrofurfuryl acrylic acid monomer, and about 1 weight percent to about 5 weight percent of the photoinitiator with respect to the total weight of the hard coating composition.

5. The hard coating composition of claim 1, wherein the photoinitiator includes:

a first photoinitiator activated by light having a first wavelength; and a second photoinitiator activated by light having a second wavelength shorter than the first wavelength.

6. The hard coating composition of claim 5, wherein the first photoinitiator is activated by light in a wavelength range of about 360 nanometer to about 410 nanometer, and the second photoinitiator is activated by light in a wavelength range of about 230 nanometer to about 310 nanometer.

7. The hard coating composition of claim 5, wherein the first photoinitiator is a diphenyl(2,4,6-trimethylbenzoyl) phosphine oxide, and the second photoinitiator is a (1-hydroxycyclohexyl)phenylmethanone.

8. The hard coating composition of claim 1, further comprising 2-isopropylthioxanthone.

9. The hard coating composition of claim 8, comprising about 0.1 weight percent to about 1 weight percent of the 2-isopropylthioxanthone with respect to the total weight of the hard coating composition.

10. The hard coating composition of claim 1, further comprising at least one of trimethoxy-[3-(oxyranylmethoxy) propyl]silane, bis[2-(methacryloyloxy)ethyl] phosphate, siloxane and silicone, at least one of a polyester resin, a urethane resin, a polyurea resin, and an epoxy resin, and at least one of a nanosilica, a porous silica, a zirconium oxide, an aluminum oxide, and a core-shell rubber, wherein the hard coating composition includes:

about 2 weight percent to about 22 weight percent of the resin;

about 1 weight percent to about 5 weight percent of the photoinitiator;

about 7 weight percent to about 17 weight percent of the trimethoxy-[3-(oxyranylmethoxy)propyl]silane;

about 4 weight percent to about 14 weight percent of the bis[2-(methacryloyloxy)ethyl] phosphate;

about 0.1 weight percent to about 1.0 weight percent of at least one of the siloxane and the silicone;

about 5.0 weight percent to about 15.0 weight percent of at least one of the polyester resin, the urethane resin, the polyurea resin, and the epoxy resin; and about 5.0 weight percent to about 15.0 weight percent of at least one of the nanosilica, the porous silica, the zirconium oxide, the aluminum oxide, and the core-shell rubber, with respect to the total weight of the hard coating composition.

11. The hard coating composition of claim 1, having a viscosity of about 10 centipoise to about 30 centipoise at room temperature of about 25 degrees Celsius.

* * * * *